Nick A. Schuster
INVENTOR

BY Edward M. Roney
ATTORNEY

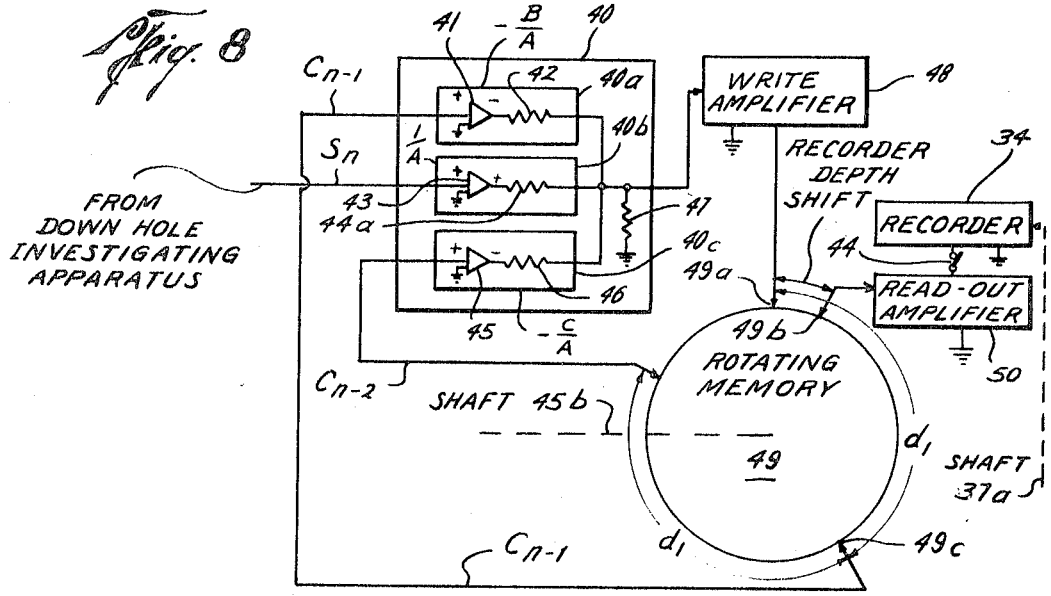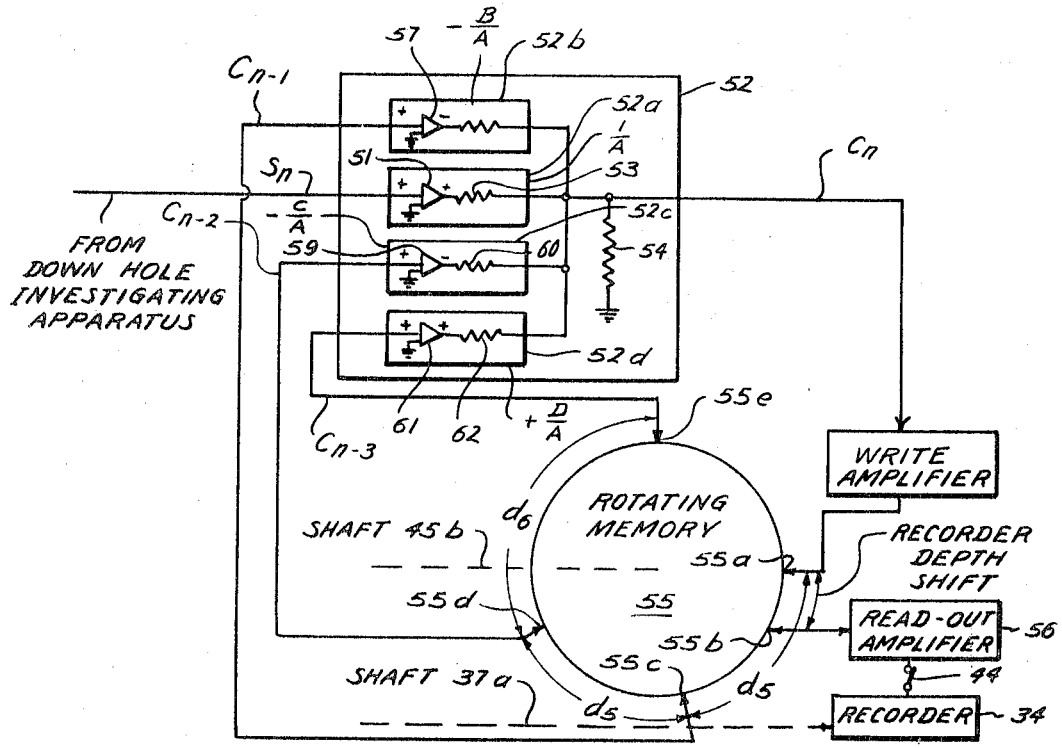

Nick A. Schuster
INVENTOR

BY Edward M. Roney

ATTORNEY

Nick A. Schuster
INVENTOR

BY Edward M. Roney
ATTORNEY

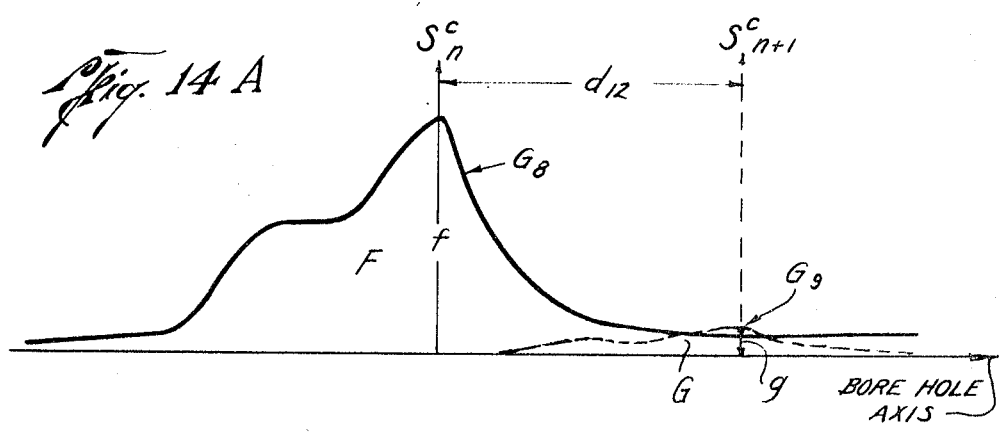
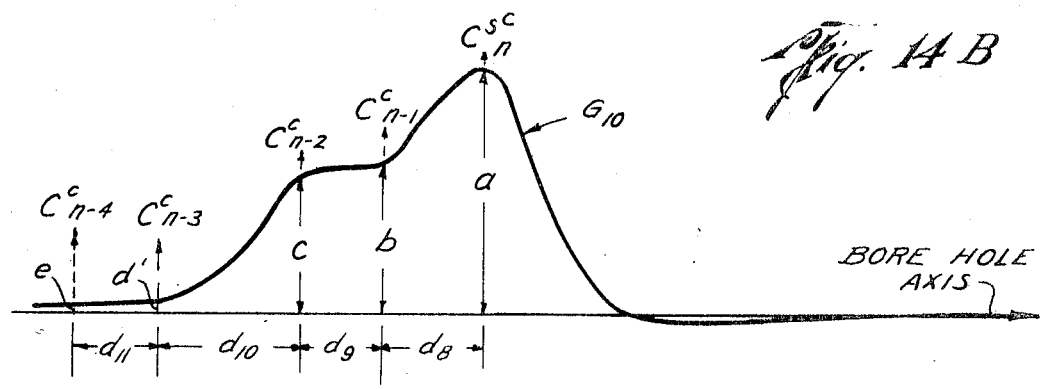
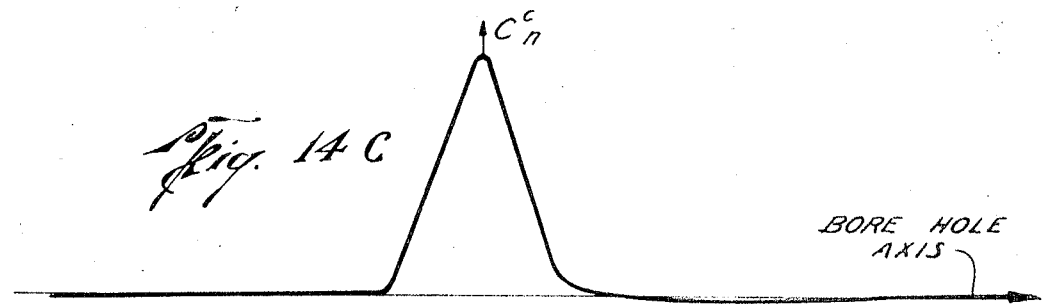

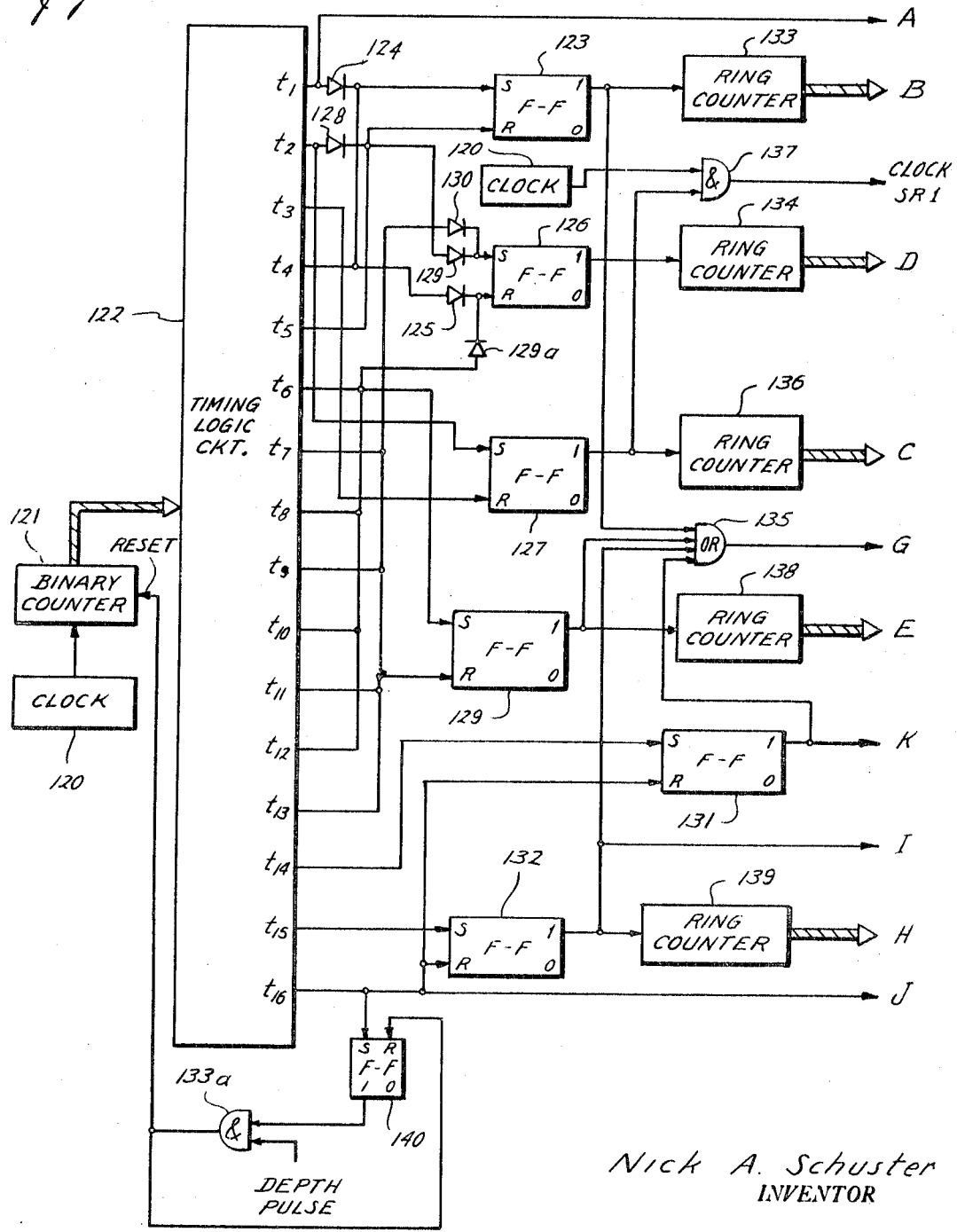

United States Patent Office 3,457,496
Patented July 22, 1969

3,457,496
METHODS AND APPARATUS FOR IMPROVING THE RESOLUTION OF WELL LOGGING MEASUREMENTS
Nick A. Schuster, Houston, Tex., assignor to Schlumberger Technology Corporation, Houston, Tex., a corporation of Texas
Filed Dec. 28, 1966, Ser. No. 605,424
Int. Cl. G01v 3/18; G06f 7/12
U.S. Cl. 324—1
27 Claims

ABSTRACT OF THE DISCLOSURE

The disclosure of this invention describes a technique for processing well logging signals indicative of an investigated subsurface characteristic to provide improved indications of the investigated characteristic at various depth or measure points in the borehole. This computational process is accomplished by combining the derived well logging signal for any given depth with at least one computed signal obtained for at least one other depth or measure point in the borehole.

---

This invention relates to signal processing methods and apparatus for processing well logging measurements for providing improved indications of subsurface conditions or characteristics. More particularly, the invention pertains to new and improved methods and apparatus for processing well logging measurements so as to provide improved well logging measurements from the raw data sent to the surface of the earth by the downhole investigating apparatus.

In the logging of subsurface earth formations surrounding a borehole, investigating apparatus is moved through the borehole and investigates the surrounding earth formations to provide an output signal which varies in accordance with variations of a characteristic of the adjoining earth formations. In electrical logging, for example, the output signal varies in accordance with the electrical resistivity or conductivity of the subsurface earth formations. In any case, it is often desirable that the investigating apparatus respond to only a relatively limited portion of the formation material which is adjacent the apparatus at any given instant. For example, it is frequently desired that the vertical resolution of the investigating apparatus be sensitive to only a limited vertical interval of the adjoining earth formations. By so doing, earth beds can be more accurately investigated.

When speaking of vertical resolution of borehole investigating apparatus, the vertical geometrical factor (hereinafter called V.G.F.) is frequently utilized to more accurately define this vertical resolution. The V.G.F. of an electrical logging type investigating apparatus, for example, describes the relative response of the investigating apparatus as a function of relative borehole depth as the investigating apparatus passes from $-\infty$ to $+\infty$ through a thin conductive bed extending radially outward from the borehole to infinity and surrounded by beds of zero conductivity. To make it easier to use, the V.G.F. is usually normalized to unity. Thus, $$\int_{-\infty}^{+\infty} X \, dz$$

is made equal to one where X is the relative response and $dz$ is a depth increment, i.e., $z$ corresponds to the axis of the borehole. This same procedure can be used to find the V.G.F. if other formation characteristics than conductivity (or its reciprocal, resistivity) are being investigated, i.e., if other than electrical logging type investigating apparatus is being utilized.

However, many investigating apparatus respond to a greater vertical region than desired (i.e., they do not have the most desirable V.G.F.). One technique for correcting this is to provide additional transducer elements in the downhole investigating apparatus to compensate for or to cancel the undesired part of the response so that the effective vertical resolution of the apparatus is substantially improved. For example, in logging by electromagnetic principles, which is referred to as "induction logging," so-called "focusing" coils are added to the downhole investigating apparatus to cancel to a large extent the response of the apparatus to the so-called "shoulder" regions lying immediately above and below the active portion of the apparatus. However, further problems tend to arise whenever additional transducer elements are added. One such problem is that the construction of the downhole investigating apparatus becomes more complex and usually more expensive. Other problems concerning the quality of the measurement may also occur. For example, in induction logging, as more coils are added to improve the vertical focusing, the depth of investigation of the apparatus in a horizontal or radial direction tends to decrease.

Another way of improving the effective vertical resolution of downhole investigating apparatus is by utilizing the signal processing or computing techniques set forth in U.S. Patent No. 3,166,709 granted to H. G. Doll on Jan. 19, 1965. This Doll patent teaches the principle of temporarily storing or memorizing well logging measurement signals obtained at various vertically spaced depth levels in the borehole within a range corresponding to the vertical range of response of the investigating apparatus. These stored signals are then combined in an appropriate manner to produce a resultant signal corresponding to the signal that would have been obtained with an investigating apparatus having better vertical resolution. This process is sometimes referred to as "computed focusing." The resultant signal is a computed signal and the relative depth levels corresponding to the stored signals which are being combined at any given instant are called computing stations. These computing stations are defined relative to the investigating apparatus and, hence, effectively move through the borehole as the investigating apparatus moves through the borehole. The relative depth level to which the resultant signal is referenced is called the center point or the recording point of the investigating system.

In following the teachings of the above-named Doll patent, it would sometimes be desirable to provide computing stations corresponding to a large number of measurement levels in the borehole, such as in those cases where the total signal received by the investigating apparatus is made up of appreciable contributions from relatively great distances from the center point or recording point of the downhole investigating apparatus. However, to accomplish this, a relatively large capacity, signal memory apparatus would be required to store the necessary number of well logging measurement signal samples. Also, the number of circuits which operate in conjunction with memory apparatus would be increased.

It is an object of the invention, therefore, to provide new and improved methods and apparatus for providing indications of earth formations surrounding a borehole wherein improved well logging measurements can be obtained with a minimum of cost and apparatus complexity.

It is another object of the invention to provide new and improved methods and apparatus for processing well logging information wherein improved computed focusing of well logging measurements can be obtained without requiring the simultaneous memorizing of a large number of well logging measurements.

In accordance with one feature of the present invention, apparatus for processing well logging signals comprises means for deriving a signal representative of a characteristic of earth formations surrounding a borehole at different depth levels in the borehole and means for combining each derived signal with at least one other signal to provide a computed signal representative of the investigated characteristic at different depth levels correlated with the depth levels of the derived signals. The apparatus further comprises memory means for storing the computed signal, including means for reading the computed signals into the memory means, and means for reading out the individual stored computed signals from the memory means at later times, at least one of the computed signals representing said at least one other signal which is combined with any given derived signal. By so doing, each read-out computed signal cancels a selected formation response portion (i.e., a selected V.G.F. portion) of each derived signal.

In accordance with another feature of the invention, a method of processing well logging signals comprises deriving a signal representative of a characteristic of the earth formations surrounding a borehole at different depth levels in the borehole and combining each derived signal with at least one other signal to provide computed signals representative of the investigated characteristic at different depth levels in the borehole correlated with the depth levels of the derived signals. The method further comprises storing the computed signals in a memory means, and reading out individual stored computed signals from the memory means, the read-out computed signals representing said at least one other signal which is combined with any given derived signal so as to cancel out a selected V.G.F. portion.

For a better understanding of the present invention, together with other and further objects thereof, reference is had to the following description taken in connection with the accompanying drawings, the scope of the invention being pointed out in the appended claims.

Referring to the drawings:

FIGURE 4 shows one example of a memory device useful in connection with the present invention;

FIGURE 8 shows apparatus for processing the well logging measurements derived from a downhole investigating apparatus having the V.G.F. of FIGURE 7(a) to provide computed signals corresponding to the V.G.F. of FIGURE 7(b);

Figure 9A:
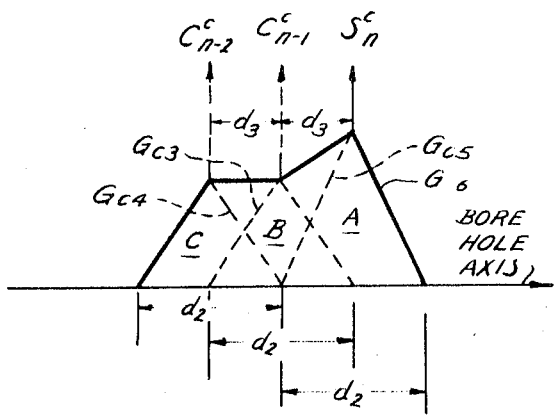
Figure 9B:
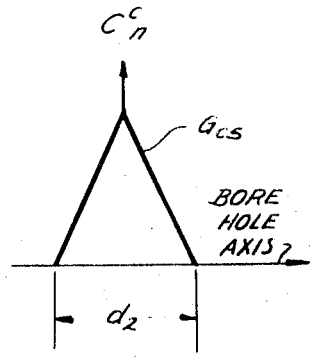
Figure 10A:
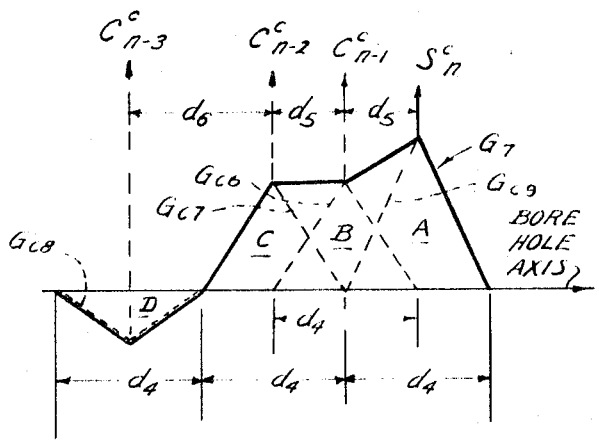
Figure 10B:
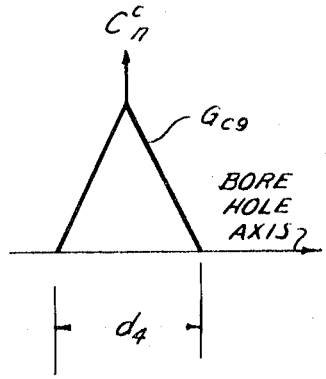
Figure 12:
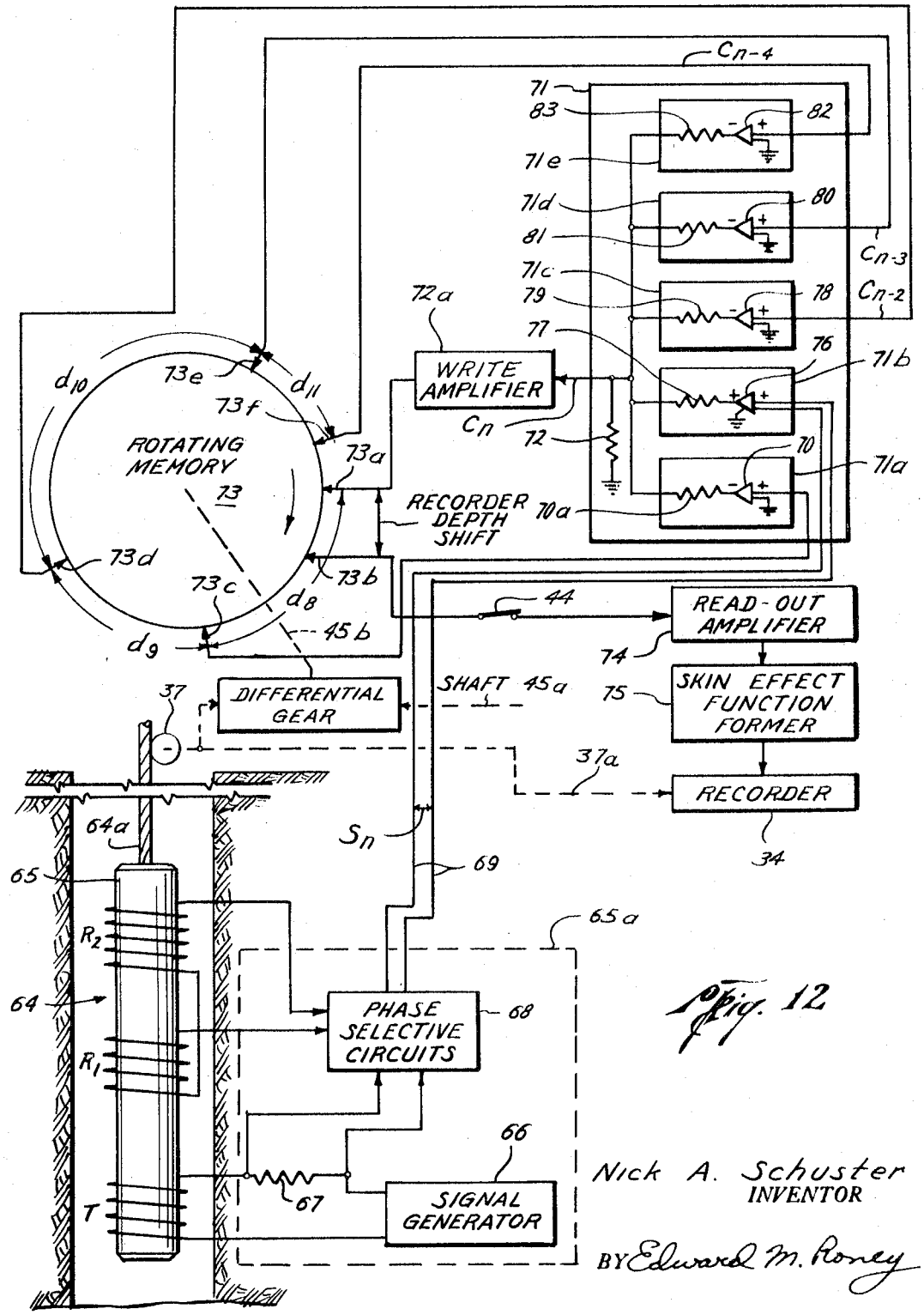
Figure 13A:
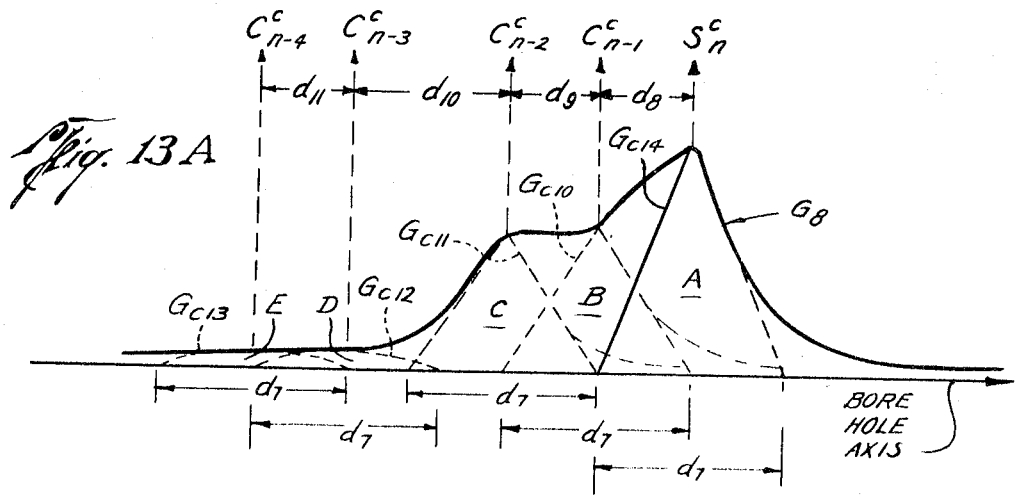
Figure 13B:
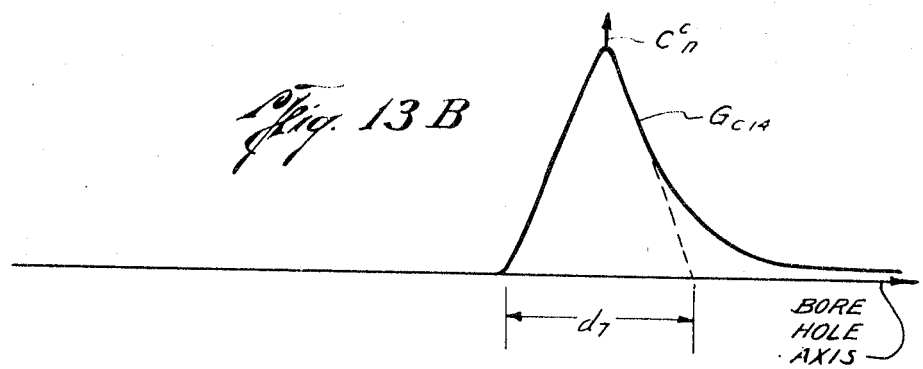
Figure 15:
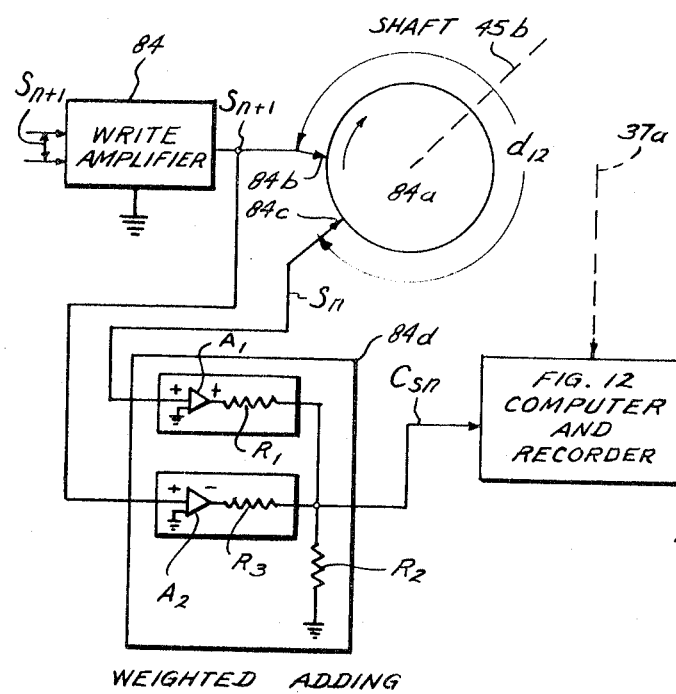
Figure 16:
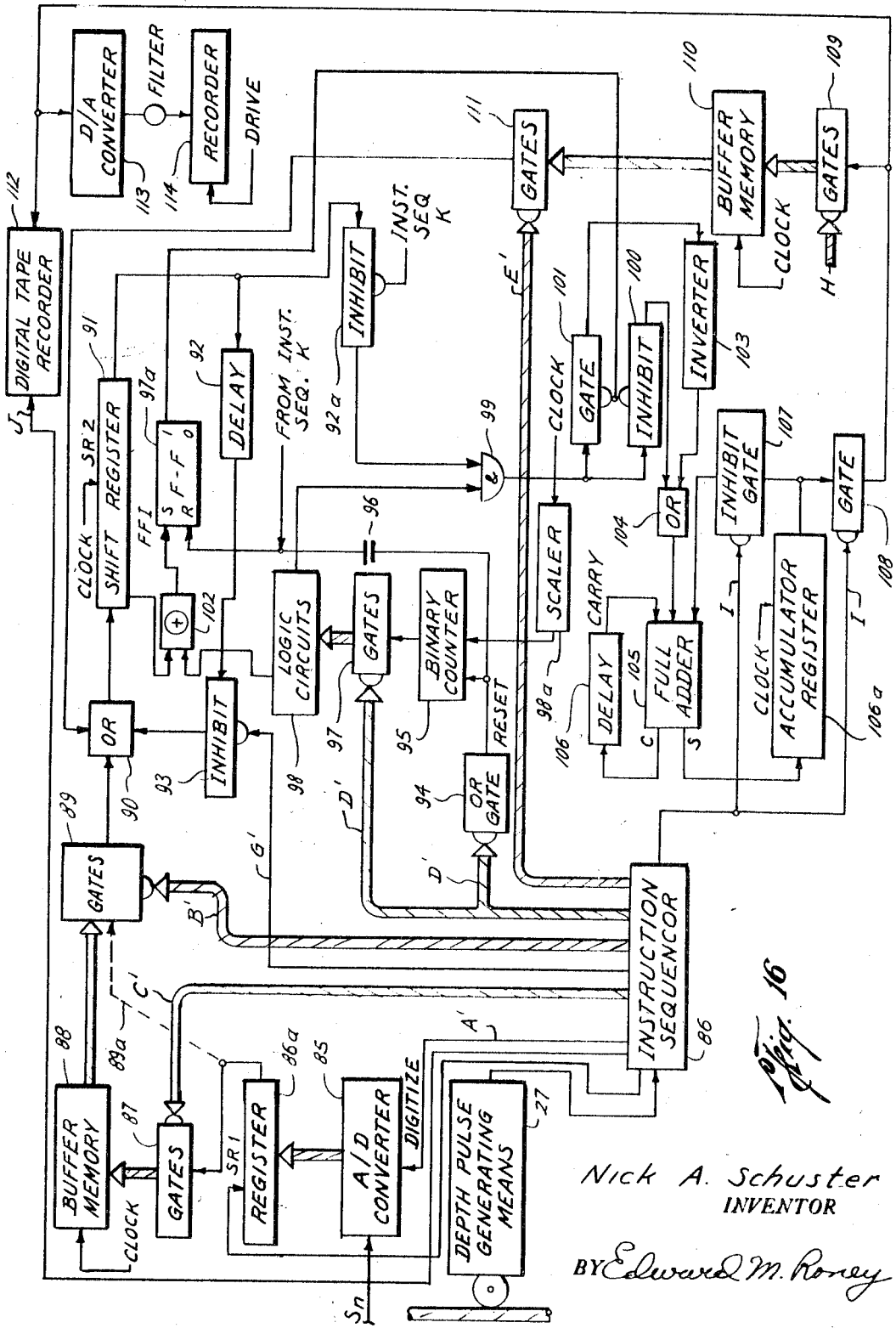

FIGURES 9(a) and 10(a) show still other original V.G.F.'s of downhole investigating apparatus along with representations of how the effectvie vertical responses of the downhole investigating apparatus corresponding to the original V.G.F.'s of FIGURES 9(a) and 10(a) can be improved;

FIGURES 9(b) and 10(b) show the resultant V.G.F.'s resulting from the procedures represented in FIGURES 9(a) and 10(a) respectively;

FIGURE 11 shows signal processing apparatus for performing the operation depicted by FIGURES 10(a) and 10(b);

FIGURE 12 shows a typical induction logging tool along with a schematic representation of the electrical circuitry associated therewith in accordance with another embodiment of the present invention;

FIGURE 13(a) represents the V.G.F. of the induction logging apparatus of FIGURE 12 along with representation of how the effective vertical response of the induction logging apparatus can be improved by the signal processing techniques;

FIGURE 13(b) shows the V.G.F. resulting from the procedure represented in FIGURE 13(a);

FIGURES 14(a), 14(b), and 14(c) show V.G.F.'s useful in explaining another feature of the present invention;

FIGURE 15 shows analog signal processing apparatus for performing the operation depicted in FIGURES 14(a) and 14(b);

FIGURE 16 is a schematic representation of a digital computer embodiment for processing well logging measurements in accordance with the operation depicted in FIGURES 14(a) and 14(b) to provide a representation of the investigated characteristic corresponding to the V.G.F. of FIGURE 14(c); and FIGURE 17 represents a portion of the circuitry of FIGURE 16 in greater detail.

Figure 1:
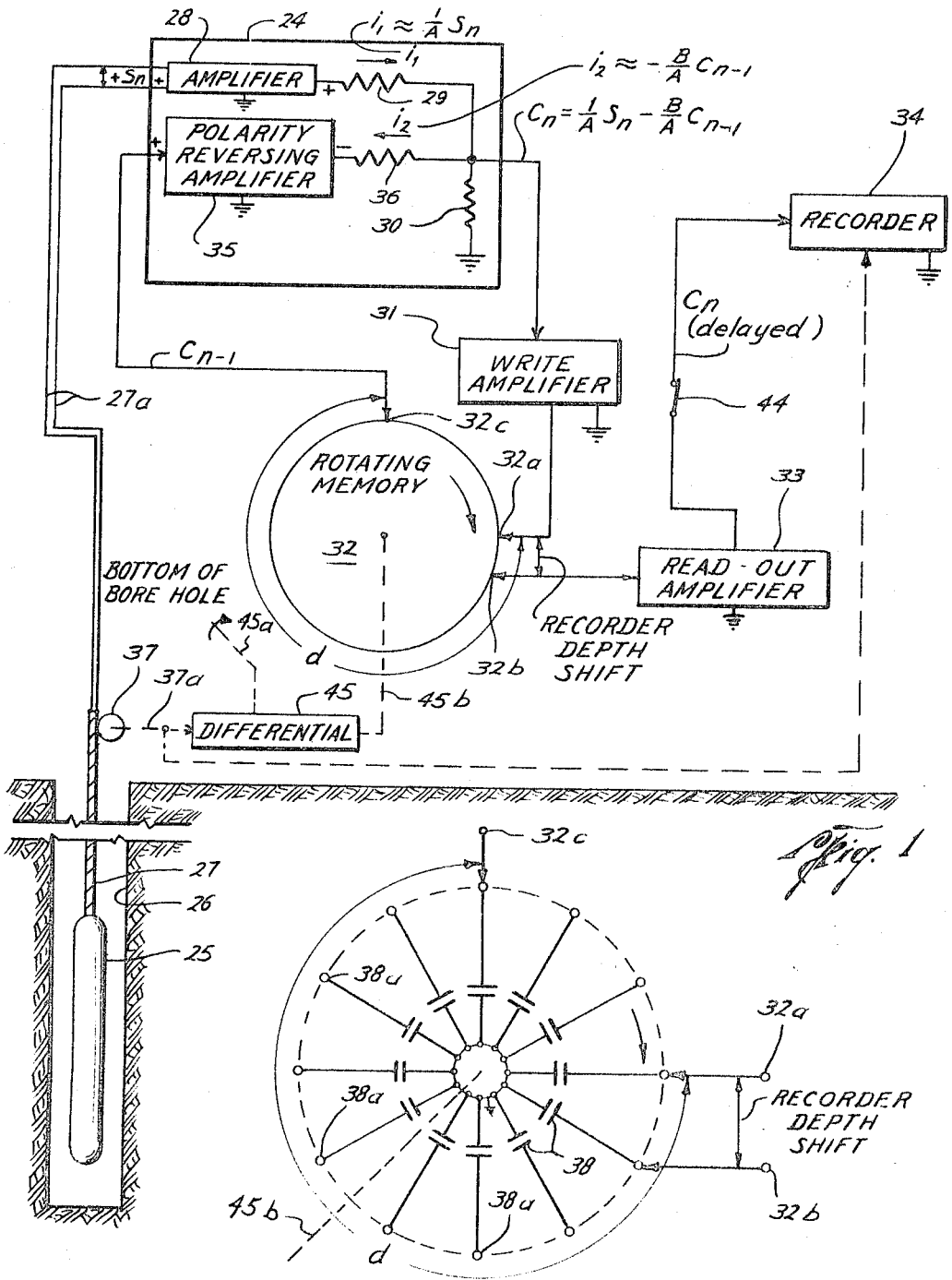
FIGURE 1 shows a downhole investigating apparatus in a borehole along with a schematic representation of one embodiment of electrical circuitry for processing the well logging signals derived from the downhole well logging apparatus.

Looking now at FIGURE 1, there is shown a downhole investigating apparatus 25 lowered into a borehole 26 on the end of a logging cable 27. The borehole investigating apparatus 25 derives a signal which is representative of the characteristic of the adjoining earth formations that is being investigated. This derived signal, is supplied by way of cable conductors 27a to an amplifier 28, which supplies the ground reference for the uphole signal processing apparatus. Amplifier 28 could be a differential amplifier, for example. Amplifier 28 has a positive gain so that the output of amplifier 28 will have the same polarity as the input thereof. The output signal from amplifier 28 is supplied through a resistor 29 of relatively high resistance to a resistor 30 of relatively low resistance and to the input of a write amplifier 31 which has a high input impedance relative to resistor 30.

The output of write amplifier 31 is connected to a write-in point 32a of a rotating memory device 32, shown rotating in a clockwise direction. The memory rotates with respect to the write-in and read-out points. The raising of the cable 27 imparts a rotation to a suitable means 37 shown as a rotating wheel, for causing rotation of a shaft 37a. This shaft 37a, drives the recording medium in recorder 34 and, through a differential gear 45, drives the rotating memory device 32, in accordance with the movement of the cable 27, and thus the movement of the downhole investigating apparatus 25 through the borehole. A shaft 45a is connected to the other input of differential 45. Located a short interval later (clockwise direction) on the periphery of rotating memory device 32 is a first read-out point 32b which is connected to the input of a read-out amplifier having a relatively high input impedance. The output of read-out amplifier 33 is supplied to a recorder 34 through a switch 44. Located a given interval, designated d, in a clockwise direction on the periphery of rotating memory device 32 is a second read-out point 32c. Read-out point 32c is connected to the input of a polarity reversing amplifier 35, which has a relatively high input impedance. The output of polarity reversing amplifier 35 is connected through a resistor 36 to the junction point between resistors 29 and 30. The resistance of resistor 36 is high relative to the resistance of resistor 30.

Before proceeding with the operation of the FIGURE 1 apparatus, it would first be desirable to explain what a vertical geometrical factor (V.G.F.) is. For this purpose, now referring to FIGURE 2, there is shown an investigating apparatus 39 supported by a cable 40 located within a borehole 41. For the present example, consider the investigating apparatus 39 to be an "induction logging" apparatus utilizing electromagnetic principles for measuring the conductivity of the earth formations adjoining the borehole 41. A conductor pair 41a supplies the signal derived by the downhole investigating apparatus 39 to a suitable voltmeter 42. A thin conductive bed 42 is shown disposed perpendicular with respect to the axis of the borehole 41 and extending to infinity in all axial directions from the borehole axis. The bed 42 is considered to have a vanishing thickness of $\epsilon$ and the conductivity of the bed 42 is $1/\epsilon$. Thus, if the thin bed is considered to be one inch thick and have a conductivity of one mho/meter, the V.G.F. will have the dimension of inch$^{-1}$. To the right of the investigating apparatus 39 is a plot of the relative response registered by meter 42 vs. depth as the investigating apparatus transgresses the thin conductive bed. Perhaps a better way to look at this is to consider the investigating apparatus as being stationary and the thin conductive bed moving with respect thereto, which can easily be carried out in the laboratory. This plot is the V.G.F. of investigating apparatus 39. It is to be understood that the particular shape of the V.G.F. curve is determined by the particular design of the investigating apparatus, such as the positioning and configuration of the transducers of the investigating apparatus.

To normalize the V.G.F., it is necessary that $$\int_{-\infty}^{+\infty} X dz = 1$$

where X is the relative response at any given depth and $dz$ is the integrating increment, $z$ being the depth axis. Now, if we set the integrating increment $dz$ equal to the unit thickness $\epsilon$ of the thin bed 42, $$\int_{-\infty}^{+\infty} X dz = 1$$

becomes $$\sum_{-\infty}^{+\infty} {}_\epsilon X \cdot \epsilon = 1$$

Figure 2:
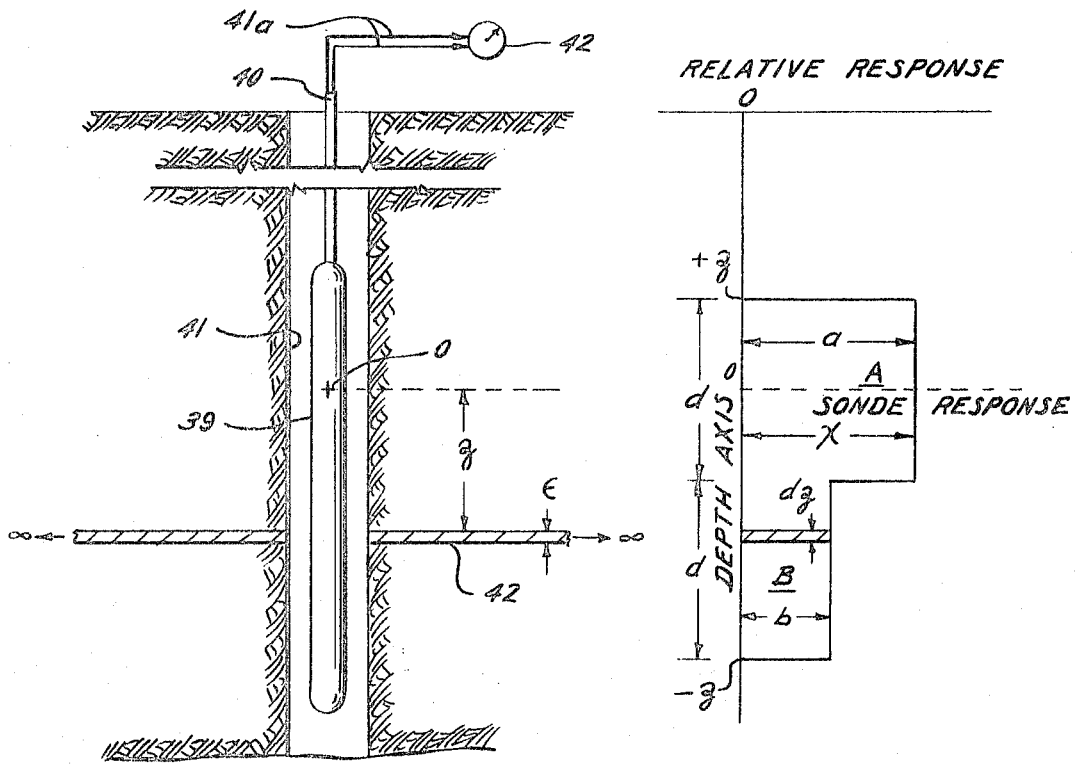
FIGURE 2 shows a downhole investigating apparatus in a borehole for measuring the response to a thin conductive bed along with the resulting V.G.F. for the purpose of defining V.G.F.

That is to say, the sum of the relative response X times each interval $\epsilon$ from $+\infty$ to $-\infty$ must be equal to 1. This is the same thing as saying that the area of the V.G.F. must be equal to one. Thus, for the V.G.F. of FIGURE 2, the area A of the large rectangle of magnitude $a$ plus the area B of the rectangle of magnitude $b$ must be equal to one. The vertical extent of both rectangles A and B is equal to $d$ in this example, and thus $$a \cdot d + b \cdot d = A + B = 1$$

in the FIGURE 2 V.G.F.

Now, taking an example of this, if a thin conductive bed of conductivity $\sigma = 1$ mho/meter is located at the position shown in FIGURE 2 with the surrounding formations having zero conductivity, and $2d = 100\epsilon$ where $\epsilon$=one inch and $a = 2b$, then $$a \cdot d + b \cdot d = a \cdot 50 + b \cdot 50 = 2b \cdot 50 + b \cdot 50 = 3b \cdot 50 = 1$$

Solving for $b$, we find that $b = \frac{1}{150}$ inch$^{-1}$. Thus, $a = \frac{2}{150}$ inch$^{-1}$. The reading recorded by meter 42 will then be $$b \cdot \sigma \cdot 1\epsilon = \frac{1}{150} \text{ inch}^{-1} \cdot 1 \text{ mho/meter} \cdot$$

$$1 \text{ inch} = \frac{1}{150} \text{ mho/meter}$$

If the conductive bed 42 were within the A portion of the V.G.F., then the meter reading would be $\frac{2}{150}$ mho/meter. Likewise, if $\sigma$ should be different or the increment $dz$ over which a particular value of $\sigma$ extends should be different (e.g., $2\epsilon$, $0.15\epsilon$, etc.), it can be seen how the meter reading will be different.

If now, the entire formation from $+z$ to $-z$ ($+z$ to $-z$ being the total depth interval of response of the V.G.F. of FIGURE 2) has a conductivity $\sigma = 1$ mho/meter, then the meter reading will be $$\sigma \cdot a \cdot d\epsilon + \sigma \cdot b \cdot d\epsilon = 1 \text{ mho/meter} \cdot 2/150 \text{ inch}^{-1}$$
$$\cdot 50 \text{ inches} + 1 \text{ mho/meter} \cdot 1/150 \text{ inch}^{-1} \cdot 50 \text{ inches} = \frac{2}{3}$$
$$\text{mho/meter} + \frac{1}{3} \text{ mho/meter} = 1 \text{ mho/meter}$$

This is the desired result, since if the total response of the investigating apparatus is derived from a 1 mho/meter earth formation, the meter should read 1 mho/meter.

Thus, it can be seen that the V.G.F. is a handy tool to determine what the response of a particular investigating apparatus is to the investigated characteristic at a given depth point. It is to be understood that a V.G.F. can be determined for other tools than "induction logging" tools and for other investigated characteristics than conductivity.

Now, it is necessary to determine a point on the depth axis ($z$ axis) which is called the depth reference point or recording point of the investigating apparatus. In the past, the depth reference point has usually been determined by integrating the V.G.F. and placing the reference point at the point where the integrated V.G.F. equals one-half of the total integrated V.G.F. That is to say, the point where the areas of the V.G.F. are equal on both the upper and lower sides of the reference point. However, for reasons to be described later, the depth reference point is now placed at the point designated O in FIGURE 2 which is directly in the center of the A rectangle on the depth $z$ axis. It is to be understood that the V.G.F. is defined with respect to the investigating apparatus. Thus, as the investigating apparatus is raised through the borehole, the V.G.F. moves along with it.

Figure 3:
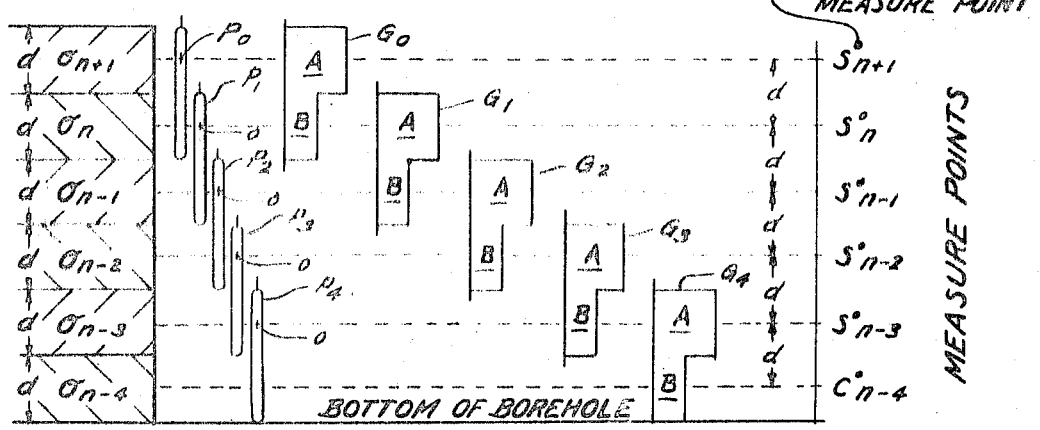
FIGURE 3 shows simplified representations of earth formation slabs traversed by a borehole along with representations of the V.G.F. of FIGURE 2 disposed opposite the various earth formations and the corresponding downhole investigating apparatus positions, useful in understanding the theory of the present invention.

Now, looking at FIGURE 3, there is shown the investigating apparats 39 of FIGURE 2 at five positions in the borebore, designated $P_0$, $P_1$, $P_2$, $P_3$ and $P_4$ in descending order of depth, $P_4$ being the lowermost position in the borehole. The V.G.F. of FIGURE 2 is shown to the right of the investigating apparatus positions of $P_0$, $P_1$, $P_2$, etc., $G_0$ corresponding to the V.G.F. of $P_0$, $G_1$ to the V.G.F. of $P_1$, etc. To the left of the investigating apparatus positions $P_0$, $P_1$, $P_2$, etc., there are represented in a diagrammatic manner a plurality of earth formation slabs representing successive vertical increments of subsurface earth formations and having conductivities designated $\sigma_{n+1}$, $\sigma_n$, $\sigma_{n-1}$, $\sigma_{n-2}$, $\sigma_{n-3}$, $\sigma_{n-4}$. These hypothetical slabs are only for purposes of deriving the mathematical expressions to be used in the explanation of the present invention, the actual earth beds being of any thickness. It will be assumed that the investigating apparatus is moving in an upwardly direction through the borehole. Each earth formation slab has a vertical length $d$ (in the direction of the borehole axis) which is equal to the vertical length of the portion A or B, or one-half the length of the total V.G.F. of FIGURE 2. The recordinging points or depth reference points corresponding to the investigating apparatus positions, $P_0$, $P_1$, $P_2$, $P_3$ and $P_4$ are designated $S°_{n+1}$, $S°_n$, $S°_{n-1}$, $S°_{n-2}$, and $C°_{n-4}$ respectively. These points $S°_{n-1}$, $S°_n$, etc. correspond to the recording point O in FIGURE 2 for each corresponding apparatus positions $P_0$, $P_1$, etc. (The o's are not powers.)

When the investigating apparatus 39 is opposite the earth formation slabs having conductivity $\sigma_n$ and $\sigma_{n-1}$ as represented by the V.G.F. $G_1$, the derived signal $S_n$ at that particular vertical position corresponding to recording point $S^o_n$, will be equal to:

$$S_n = A\sigma_n + B\sigma_{n-1} \quad (1)$$

In like fashion, the derived signals for the other V.G.F. positions can be written as:

$$S_{n-1} = A\sigma_{n-1} + B\sigma_{n-2} \quad (2)$$
$$S_{n-2} = A\sigma_{n-2} + B\sigma_{n-3} \quad (3)$$
$$S_{n-3} = A\sigma_{n-3} + B\sigma_{n-4} \quad (4)$$

where $S_{n-1}$, $S_{n-2}$, $S_{n-3}$ correspond to the derived signals for the recording points $S^o_{n-1}$, $S^o_{n-2}$, and $S^o_{n-3}$ respectively and the V.G.F.'s $G_2$, $G_3$ and $G_4$ respectively. Again, the $o$ of $S^o_n$, etc. designates depth or measure points (not powers). Solving Equation 1 for $\sigma_n$, $$\sigma_n = \frac{1}{A}S_n - \frac{B}{A}\sigma_{n-1} \quad (5)$$

The similar relationships for $\sigma_{n-1}$, $\sigma_{n-2}$, and $\sigma_{n-3}$ are:

$$\sigma_{n-1} = \frac{1}{A}S_{n-1} - \frac{B}{A}\sigma_{n-2} \quad (6)$$

$$\sigma_{n-2} = \frac{1}{A}S_{n-2} - \frac{B}{A}\sigma_{n-3} \quad (7)$$

$$\sigma_{n-3} = \frac{1}{A}S_{n-3} - \frac{B}{A}\sigma_{n-4} \quad (8)$$

However, Equations 5–8 cannot be individually utilized to determine the true conductivity $\sigma$ of the various earth formation slabs since the conductivity of the earth formation slabs located below the earth formation slab which is presently under investigation is not known. That is to say, the only known relationships in Equations 5–8 are $S_n$, $S_{n-1}$, etc. However, it is seen that in each of the Equations 5–8, if the conductivity from the next lower earth formation slab were known, the conductivity of the earth formation slab in question can be determined. However, to separately determine these individual slab conductivities would require the use of an investigating apparatus having a V.G.F. one-half as long as the V.G.F. of FIGURE 2 or equal to the length of one earth slab $n$, $n-1$, etc. (i.e., equal to $d$). In accordance with the present invention, however, the desired results can be accomplished by a computed conductivity value for each earth formation slab. Thus, substituting the symbols $C_n$, $C_{n-1}$, etc. denoting these computed values, for $\sigma_n$, $\sigma_{n-1}$, etc. in Equations 5–8, $$C_n = \frac{1}{A}S_n - \frac{B}{A}C_{n-1} \quad (9)$$

$$C_{n-1} = \frac{1}{A}S_{n-1} - \frac{B}{A}C_{n-2} \quad (10)$$

$$C_{n-2} = \frac{1}{A}S_{n-2} - \frac{B}{A}C_{n-3} \quad (11)$$

$$C_{n-3} = \frac{1}{A}S_{n-3} - \frac{B}{A}C_{n-4} \quad (12)$$

However, there are still two unknowns in each equation.

But, substituting Equation 12 into Equation 11 and the results into Equation 10 and the results of that into Equation 9, the following equation for $C_n$ can be written.

$$C_n = \frac{1}{A}S_n - \frac{B}{A^2}S_{n-1} + \frac{B^2}{A^3}S_{n-2} - \frac{B^3}{A^4}S_{n-3} + \frac{B^4}{A^4}C_{n-4} \quad (13)$$

Equation 13 can be extended out as far as desired by including the computed values for $C_{n-4}$, $C_{n-5}$, etc.

Now substituting the derived signals of Equations 1–4 into Equation 13 and simplifying gives the result:

$$C_n = \sigma_n - (B/A)^4 (\sigma_{n-4} - C_{n-4}) \quad (14)$$

It can now be seen that the computed value of conductivity of the $n$th slab $C_n$ will be exactly equal to the actual conductivity $\sigma_n$ of the $n$th slab provided that the second term of Equation 14 is equal to zero. Thus, if the computed value $C_{n-4}$ is equal to the actual conductivity $\sigma_{n-4}$ of the $n-4$ slab, then the second term of Equation 14 will, in fact, be zero. Assuming this to be so, Equation 14 gives a correct answer for $C_n$.

Equation 14 can be expressed in more general terms for earth formations beyond the $n-4$ slab. This general expression is:

$$C_n = \sigma_n - (B/A)^m (\sigma_{n-m} - C_{n-m}) \quad (15)$$

where $m$ represents the total number of V.G.F. positions $G_1$, $G_2$, ... $G_m$ being considered. If now the quantity $B/A$ is less than unity, which is the case shown in the V.G.F. of FIGURES 2 and 3, it can be seen that as more and more earth formation slabs are included in the calculation, the second term of Equation 15 will approach zero even if the term $(\sigma_{n-m} - C_{n-m})$ of Equation 15 is not equal to zero. Thus, for example, if the downhole investigating apparatus originally started with the V.G.F. portion B at the $n-9$ slab, and if $B/A$ is assumed to be equal to one-half (as is the case shown in FIGURES 2 and 3), then Equation 15 can be written as:

$$C_n = \sigma_n - \frac{1}{1024}(\sigma_{n-10} - C_{n-10}) \quad (16)$$

Thus, it can be seen that the second term of Equation 15 must approach zero as more and more earth formation slabs are transgressed and thus included in the calculation. Another point to be noted is that if an error should occur at some intermediate point along the borehole, this error will be quickly eliminated as the earth formation investigating apparatus moves away from the point of error. Thus, since the conductivity $\sigma$ for each preceding slab is now fairly accurately known as the investigating apparatus 11 transgresses upwardly past the earth formation slabs, the new computed conductivity reading $C_n$ for each newly encountered slab can be determined.

Referring back to Equation 9, one other factor should be noted. To have the computed conductivity $C_n$ actually equal to the true conductivity $\sigma_n$, rather than proportional thereto, the sum of the weighting factors should be equal to one. Thus, in Equation 9, $$\frac{1}{A} - \frac{B}{A}$$

should equal one. This condition is automatically obtained if the A and B values are taken from a normalized V.G.F. as discussed earlier (i.e. $A+B=1$). If A and B are not normalized values, then this can be accomplished by multiplying a constant Y times the weighting factors. Thus, $$Y\left(\frac{1}{A} - \frac{B}{A}\right) = 1$$

and $$\left(Y\frac{1}{A} - Y\frac{B}{A}\right) = 1$$

(Note: Y will equal 1 if A and B are normalized values, i.e., if $A+B=1$ in the V.G.F. of FIGURES 2 and 3.)

Referring back to FIGURE 1 it will be shown how the apparatus of FIGURE 1 performs the mathematical operation described above. Looking at Equation 9, for example, the computed signal $C_{n-1}$ corresponding to the preceding earth formation slab having a conductivity $\sigma_{n-1}$ and the signal $S_n$ corresponding to the derived signal when the investigating apparatus is at the position $P_1$ in FIGURE 3, are combined in adding network 24. In accordance with Equation 9, the signal $S_n$ has a weighting factor $1/A$ and the signal $C_{n-1}$ has a weighting factor $-B/A$. The signal derived from the downhole investigating apparatus 25, after amplification by amplifier 28 is supplied to a resistor 29. In line with the Equation 9 example, this derived signal will be designated $S_n$.

Considering amplifier 28 to have a voltage gain of $U_1$, the output voltage of amplifier 28 will be equal to $U_1 S_n$. Now, since resistor 29 is much larger than resistor 30, the current $i_1$ through resistor 29 will equal $$\frac{U_1 S_n}{R_{29}}$$

where $S_n$ is the voltage applied to amplifier 28 and $R_{29}$ is the resistance of resistor 29. Thus, by making $U_1/R_{29}$ proportional to $1/A$, $i_1$ will be proportional to $1/AS_n$. The computed signal read out of rotating memory 32 at the read-out point 32c (in line with the Equation 9 example, this computed signal is designated $C_{n-1}$), after amplification and polarity inversion by polarity reversing amplifier 35, having a voltage gain $-U_2$, has an output voltage proportional to $-C_{n-1}$. Again, since resistor 36 has a much higher resistance than resistor 30, the current $i_2$ through resistor will be equal to $$\frac{-U_2 C_{n-1}}{R_{36}}$$

where $C_{n-1}$ is the voltage applied to amplifier 35 and $R_{36}$ is the resistance of resistor 36. By making $-U/R_{36}$ proportional to $-B/A$, it can be seen that $-i_2$ is proportional to $$-\frac{B}{A} C_{n-1}$$

The voltage developed across resistor 30 having a resistance $R_{30}$ is $(i_1 - i_2) R_{30}$. Thus, the voltage developed across resistor 30 is proportional to $$\frac{1}{A} S_n - \frac{B}{A} C_{n-1}$$

which is equal to $C_n$. This new computed value $C_n$ is then written into rotating memory 32 at write-in point 32a through write amplifier 31. The gain of write amplifier 31 and the resistance of resistor 30 can be set to provide the proper system gain, that is, if the voltages applied to amplifiers 28 and 35 are equal to each other, the voltage applied to write-in point 32a will also be equal to the applied voltages.

It is to be understood that the important factors here are the weights $1/A$ and $B/A$ relative to each other. The gains of the circuit devices can be adjusted in the usual manner. This same value $C_n$ is then read-out of rotating memory 32 at read-out point 32b and supplied to recorder 34. Remembering that rotating memory 32 is driven by rotating wheel 37, thus making rotating memory 32 rotate as the investigating apparatus 25 moves through the borehole 26, the interval between write-in-read-out points are proportional to depth intervals in the borehole. The interval in a clockwise direction points 32a and 32c is proportional to the distance $d$ between measure points $S^0_n$, $S^0_{n-1}$, etc. in FIGURE 3. The clockwise interval between points 32a and 32b is the depth interval which the recorder must be shifted to record $C_n$ at the proper depth.

Looking now at FIGURE 4, there is shown a typical rotating memory device that could be utilized with the FIGURE 1 apparatus as rotating memory 32. The FIGURE 4 rotating memory has a plurality of capacitors 38 whose contact points 38a are spaced equal increments apart on the periphery of the rotating memory device. The memory device is caused to rotate in accordance with the movement of the downhole investigating apparatus through the borehole by shaft 37a and thus, the interval between capacitors is proportional to given increments of depth in the borehole. The write-in and read-out points 32a, 32b and 32c of FIGURE 1 are shown in FIGURE 4, as are the intervals $d$ of FIGURES 1 and 3 and the recorder depth shift of FIGURE 1. The write amplifier 31 in FIGURE 1 has a low output impedance so that each capacitor 38 will rapidly charge or discharge to the new voltage value of $C_n$ from write amplifier 31. The read-out amplifiers 33 and 35 have high input impedances so that negligible charge will be drawn from the capacitors 38 leaving the voltages thereon relatively unchanged.

It is to be understood that other memory devices and write-in-read-out circuits could be utilized than the one shown in FIGURES 1 and 4. For example, the apparatus disclosed in U.S. Patent 3,181,117 granted to W. J. Sloughter on Apr. 27, 1965, wherein suitable switching circuits for stepping between stationary capacitors, could be utilized. Another memory and write-in-read-out system that could be utilized is the magnetic memory system and associated write-in-read-out configuration disclosed in the previously mentioned Doll Patent 3,166,709.

The supplying of the computed signal $C_n$ to recorder 34 from read-out point 32b of rotating memory 32 instead of directly from weighted adding circuit 24, in FIGURE 1, is due to the fact that during the interval when the write-in-read-out points are not electrically connected to the capacitors 38, the $C_{n-1}$ reading will not be subtracted from the derived signal $S_n$ which is continually supplied to amplifier 28, thus causing an erroneous value of $C_n$ to recorder 34. However, if the memory device supplies a continuous signal for $C_{n-1}$, as in the case of a magnetic memory device, or by suitable filtering of the read-out signal $C_{n-1}$, the computed signal $C_n$ from weighted adding network 24 could be supplied directly to recorder 34. If the capacitor type memory of FIGURE 4 is utilized, the delayed computed signal $C_n$ supplied to recorder 34 will be in the form of pulses, thus requiring suitable filtering. If recorder 34 is the customary galvanometer type recorder, the mechanical damping of the galvanometer moving element should supply the necessary filtering.

Figure 5:
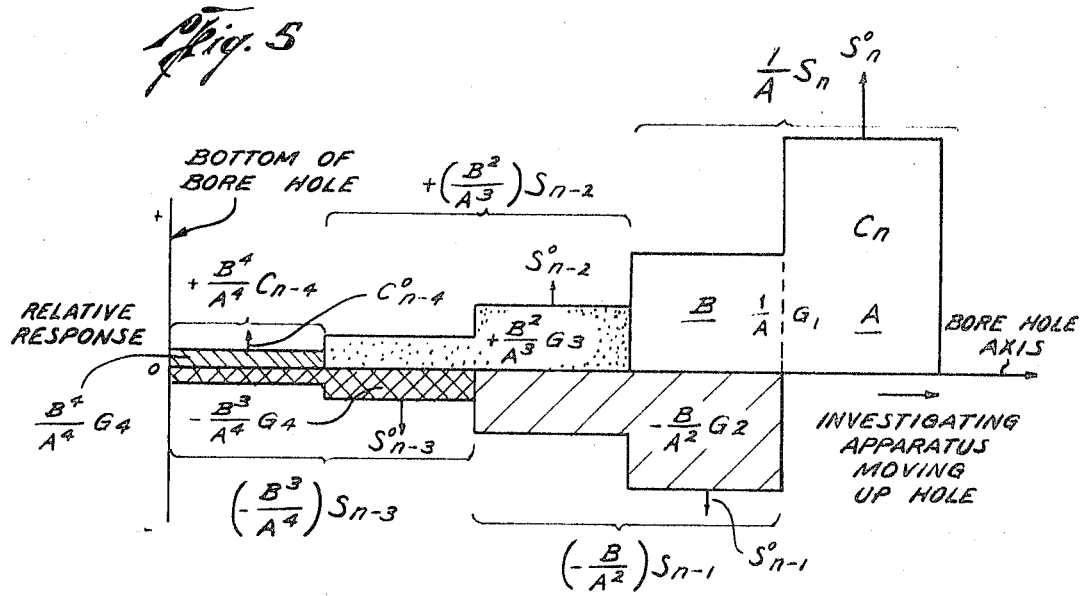
FIGURE 5 represents in a graphical manner, how the apparatus of FIGURE 1 processes the well logging measurements in accordance with one feature of the present invention.

Now looking at FIGURES 1, 3 and 5 in conjunction, it will be shown how the computed signal $C_n$ is obtained in the FIGURE 1 apparatus and what it represents. When the investigating apparatus 25 of FIGURE 1 having the V.G.F. of FIGURE 2 is at the position $P_4$ corresponding to the V.G.F. $G_4$ in FIGURE 3, the derived signal from the downhole investigating apparatus 25 is designated $S_{n-3}$. (The reason for this designation $S_{n-3}$ at the investigating apparatus position $P_4$ is because the depth reference or recording point O of the investigating apparatus is opposite earth slab $\sigma_{n-3}$). Equation 4 gives the relationship for $S_{n-3}$.

Now, to have the proper readings in the rotating memory 32 while the investigating apparatus 25 is at the bottom of the borehole, the rotating memory 32 is rotated while the downhole investigating apparatus 25 remains stationary in the borehole, but still supplying the derived signal $S_n$ to the surface of the earth. This function is designated by shaft 45a to differential gear 45, which causes rotation of rotating memory 32. Switch 44 is open during this initial operation.

Since $A+B=1$ (for normalization) and $A=2b$ for the V.G.F. of FIGURES 2 and 3, it can be seen that $$1/A = \tfrac{3}{2}$$

and $-B/A = -\tfrac{1}{2}$. Thus, the signal supplied to memory 32 is $\tfrac{3}{2} S_{n-3}$. This voltage, $\tfrac{3}{2} S_{n-3}$, is supplied to memory 32 until the initial voltage written into memory 32 is at read-out point 32c, since no voltage is picked up by read-out point 32c until this time to be combined with $\tfrac{3}{2} S_{n-3}$. Now, the voltage $\tfrac{3}{2} S_{n-3}$ is read-out to weighted adding network 24 where it is multiplied by $-B/A$, which is equal to $-\frac{1}{2}$. Remembering that $S_{n-3}$ is still being supplied to weighted adding network 24, the new voltage supplied to write in point 32a is $$\tfrac{3}{2}S_{n-3} - \tfrac{1}{2} \times \tfrac{3}{2}S_{n-3} = \tfrac{3}{4}S_{n-3}$$

After the memory 32 has rotated another interval $d$, the voltage written into memory 32 is $$\tfrac{3}{2}S_{n-3} - \tfrac{1}{2} \cdot \tfrac{3}{4}S_{n-3} = \tfrac{9}{8}S_{n-3}$$

After the third interval $d$, it is $$\tfrac{3}{2}S_{n-3} - \tfrac{1}{2} \cdot \tfrac{9}{8}S_{n-3} = \tfrac{15}{16}S_{n-3}$$

and after the fourth, it is $$\tfrac{3}{2}S_{n-3} - \tfrac{1}{2} \cdot \tfrac{15}{16}S_{n-3} = \tfrac{33}{32}S_{n-3}$$

etc. It can be seen that after each rotation of memory 32, the value at every point on memory 32 (every capacitor if a capacitor memory is used) becomes closer to $S_{n-3}$, which is the desired result. That is, if $\sigma_{n-3} = \sigma_{n-4}$, then, from Equation 4, $$S_{n-3} = A\sigma_{n-3} + B\sigma_{n-4} = \sigma_{n-4}$$

$A + B = 1$. If $\sigma_{n-3}$ does not equal $\sigma_{n-3}$, then the values stored in memory 32 will not be exactly correct, but as will be shown later, any error incurred at the bottom of the borehole will be quickly eliminated.

Looking at Equation 12, there is a computed value $C_{n-4}$ to be combined with the derived signal $S_{n-3}$ to provide the new computed value $C_{n-3}$. In FIGURE 3, this computed value $C_{n-4}$ is opposite the $n-4$th earth slab a distance $d$ below the reference or recording point O of the investigating apparatus at position $P_4$. Thus, assume for the present that the value stored in memory 32 at read-out point 32c is the computed value $C_{n-4}$ corresponding to the computed conductivity of the $n-4$th earth slab. Thus, the derived signal $S_{n-3}$ at position $P_4$ supplied to amplifier 28 is weighted by the weighting factor $1/A$ and the computed value $C_{n-4}$ read out of memory 32 is weighted by $-B/A$ giving Equation 12, $$\left[ C_{n-3} = \tfrac{1}{A}S_{n-3} - \tfrac{B}{A}C_{n-4} \right]$$

Now when the investigating apparatus has moved upward a distance $d$ in the borehole to position $P_3$ corresponding to the reference or recording point O of the investigating apparatus being opposite the earth slab having a conductivity $\sigma_{n-2}$, the derived signal at this point, $S_{n-2}$, is supplied to amplifier 28 within weighted adding network 24. The new computed signal $C_{n-2}$ supplied to write-in point 32a can be written as:

$$C_{n-2} = \tfrac{1}{A}S_{n-2} - \tfrac{B}{A}C_{n-3} = \tfrac{1}{A}S_{n-2} - \tfrac{B}{A^2}S_{n-3} + \tfrac{B^2}{A^2}C_{n-4}$$

(17)

This can be seen from the fact that the value $S_{n-3}$ which was supplied to write-in point 32a when the downhole investigating apparatus was at position $P_4$ is now at the point on rotating memory 32 opposite read-out 32c corresponding to position $P_3$, the distance $d$ between $P_3$ and $P_4$ corresponding to the distance $d$ between write-read-in point 32a and read-out point 32c.

Now, when the downhole investigating apparatus 25 moves to the position $P_2$ in FIGURE 3 corresponding to the depth reference or recording point O being opposite the $n-1$th earth slab having a conductivity $\sigma_{n-1}$, the newly derived signal $S_{n-1}$ and the previously computed $C_{n-2}$ are supplied to weighted adding network 24 in the same manner to provide the new computed value of the $n-1$th earth slab in accordance with the expression:

$$C_{n-1} = \tfrac{1}{A}S_{n-1} - \tfrac{B}{A}C_{n-2} = \tfrac{1}{A}S_{n-1}$$

$$-\tfrac{B}{A^2}S_{n-2} + \tfrac{B^2}{A^3}S_{n-3} - \tfrac{B^3}{A^3}C_{n-4}$$

(18)

where the $C_{n-2}$ term comes from Equation 17. When the downhole investigating apparatus 25 has moved a distance $d$ to the position $P_1$ corresponding to the reference or recording point O being opposite the $n$th earth slab, the previously computed value $C_{n-1}$ is at the read-out point 32c and the derived signal $S_n$ is being supplied to amplifier 28, the new computed value $C_n$ is:

$$C_n = \tfrac{1}{A}S_n - \tfrac{B}{A}C_{n-1} = \tfrac{1}{A}S_n - \tfrac{B}{A^2}S_{n-1}$$

$$+\tfrac{B^2}{A^3}S_{n-2} - \tfrac{B^3}{A^4}S_{n-3} + \tfrac{B^4}{A^4}C_{n-4}$$

(19)

where the expression for $C_{n-1}$ is obtained from Equation 18. (Note that Equation 19 is the same as Equation 13, the deviation of Equation 19 showing how the FIGURE 1 apparatus arrives at Equation 13.

Now, remembering that the computed value of conductivity $C_{n-4}$ for the actual conductivity $\sigma_{n-4}$ of the $n-4$th earth slab was assumed and will be accurate only if $\sigma_{n-3} = \sigma_{n-4}$, Equation 14 which was obtained by combining Equations 1–4 with Equation 13 or 19 (since in the V.G.F. of FIGURES 2 and 3, $A = 2B$), becomes $$C_n = \sigma_n - \tfrac{1}{16}(\sigma_{n-4} - C_{n-4}) \quad (20)$$

Thus, it can be seen that any error resulting from the bottom of the borehole assumption that $\sigma_{n-3} = \sigma_{n-4}$ is substantially reduced as the downhole investigating apparatus moves away from the bottom of the borehole.

Referring now to FIGURE 5, it will be shown diagrammatically how the FIGURE 1 apparatus performs the operation discussed above utilizing the V.G.F. of FIGURES 2 and 3. The V.G.F.'s corresponding to the terms of Equations 13 or 19 are shown in FIGURE 5. Remembering that a V.G.F. gives the response of the investigating apparatus to the investigated characteristic, if the signal derived at a given measure or depth point in the borehole is multiplied by a constant, this has the same effect as multiplying the V.G.F. by that constant. Since, in the FIGURE 1 apparatus, the derived signal was multiplied by $1/A$, the V.G.F. $G_1$ of FIGURE 3 is shown as $$\tfrac{1}{A}G_1$$

corresponding to the measure point $S^\circ_n$. Since the signal $S_{n-1}$ corresponding to V.G.F. $G_2$ was multiplied by $1/A$, stored in memory 32, and then multiplied by $-B/A$, the V.G.F. $G_2$ corresponding to the derived signal $S_{n-1}$ at measure point $S^\circ_{n-1}$ is $$-\tfrac{B}{A^2}G_2$$

when the investigating apparatus has moved to measure point $S^\circ_n$. Likewise, the V.G.F. $G_3$ corresponding to the derived signal $S_{n-2}$ at measure point $S^\circ_{n-2}$ is $$\tfrac{B^2}{A^3}G_3$$

when the investigating apparatus has moved to measure point $S^\circ_n$, since the signal $S_{n-2}$ was multiplied by $1/A$ when derived, and stored and multiplied by $-B/A$ two times. Likewise, the V.G.F. $G_4$ corresponding to the derived signal $S_{n-3}$ at measure point $S^\circ_{n-3}$ is $$-\tfrac{B^3}{A^4}G_4$$

when the investigating apparatus has moved to measure point $S^\circ_n$. These weighted V.G.F.'s are shown in FIGURE 5, $$\tfrac{1}{A}G_1$$

being the upper (positive) V.G.F. at the right hand side of FIGURE 5, $$-\frac{B}{A^2}G_2$$

being the lower (negative V.G.F. overlapping $$\frac{1}{A}G_1, +\frac{B^2}{A^3}G_3$$

being the upper V.G.F. overlapping $$-\frac{B}{A^2}G_2, -\frac{B^3}{A^4}G_4$$

being the lower V.G.F. overlapping $$+\frac{B^2}{A^3}G_3$$

To cancel the B or lesser magnitude portion of the weighted V.G.F. component $$-\frac{B^3}{A^4}G_4$$

it is necessary to add a V.G.F. which is a factor B times this last V.G.F. of $$-\frac{B^3}{A^4}G_4$$

and of opposite polarity. Thus, $$B\left(\frac{B^3}{A^4}\right)G_4 = \frac{B^4}{A^4}G_4$$

which is the V.G.F. corresponding to measure point $C^\circ_{n-4}$.

The portions of Equation 13 or 19 having the signal values $S_n$, $S_{n-1}$, $S_{n-2}$, $S_{n-3}$, and $C_{n-4}$ are shown bracketed in FIGURE 5, corresponding to the signal values obtained from the corresponding V.G.F.'s of FIGURE 5. The computed value $$\frac{B^4}{A^4}C_{n-4}$$

represents the assumed value for the bottom of the borehole, discussed earlier. It can be seen from FIGURE 5 that even if this bottom of the borehole assumption is erroneous, this $C_{n-4}$ value has been attenuated to such an extent by the time the investigating apparatus is at position $P_1$, that any error at the $C^\circ_{n-4}$ measure point will be negligible. (Also, see Equation 20.)

It can be seen from FIGURE 5 that, starting with the B portion of the V.G.F.

$$\frac{1}{A}G_1$$

corresponding to measure point $S^\circ_n$ and continuing to the left, all of the component V.G.F.'s cancel out with the exception of the A portion of the V.G.F.

$$\frac{1}{A}G_1$$

This remaining portion is the computed V.G.F. designated $C_n$, corresponding to the $n$th earth slab. Thus, it can be seen that the FIGURE 1 apparatus provides a computed signal $C_n$ corresponding to a V.G.F. having one-half the vertical extent (vertical being the direction of the borehole axis) of the original V.G.F. of the downhole investigating apparatus. (As shown in FIGURES 2 and 3.) Remembering that the depth reference or recording point O is determined by finding the point where the integrated V.G.F. is equal to one-half of the total, the reference point O was placed in the center (vertically) of the A portion of the investigating apparatus original V.G.F. because this A portion, only, is the effective V.G.F. of the system. (i.e. by placing the point O at that point originally, the derivation of the computed value $C_n$ was relatively simple as concerns the location of the reference or recording point.)

It is to be understood that while only four V.G.F. positions (5 earth slabs) have been shown in FIGURE 5 (and the earlier mathematical derivation), the same principles apply as the investigating apparatus moves up the borehole. Also, while only given measure points a distance $d$ apart in FIGURES 3 and 5 were shown in explaining the theory of the present invention, it is to be understood that the downhole investigating apparatus is continually deriving a signal $S_n$ as it moves up the borehole, and thus continually supplying a computed signal $C_n$ to memory 32. Thus, the investigating apparatus of FIGURE 3 is also deriving signals $S_n$ between positions $P_4$ and $P_3$, $P_3$ and $P_2$, etc.

From the preceding discussion in connection with FIGURES 1, 2, 3 and 5, it can be seen that, given a specific V.G.F. of an investigating apparatus (an original apparatus V.G.F.) a portion of that original V.G.F. can be cancelled out to leave a resulting computed V.G.F. of narrower vertical extent. (Remember that when speaking of V.G.F.'s, a handy tool is being utilized. As set out earlier, signal magnitudes are dependent on the V.G.F. Thus, if the B portion of the FIGURES 2 and 3 V.G.F. is completely cancelled out, earth formations opposite this B portion will contribute no signal components.) Remembering that the V.G.F.

$$\frac{1}{A}G_1$$

corresponds to the derived signal $S_n$ after being weighted by the weighting factor $1/A$, the remainder of the V.G.F.'s shown in FIGURE 5 correspond to the computed signal $C_{n-1}$ after being weighted by weighting factor $-B/A$, (thus, $$-\frac{B}{A}C_{n-1})$$

This can also be seen in Equation 9. From FIGURE 5, it can be seen that all portions of the V.G.F.'s corresponding to $C_{n-1}$ cancel out with the exception of the A portion (larger portion) of $$-\frac{B}{A}G_2$$

Thus, this A portion of $$-\frac{B}{A}2G_2$$

can be considered as the V.G.F. corresponding to $$-\frac{B}{A}C_{n-1}$$

Another way to look at this operation is that the computed signal $C_n$, corresponding to the resulting V.G.F. in FIGURE 5, can be used to cancel out undesired portions of the original V.G.F. That is to say, the computed signal $C_n$ at measure point $S^\circ_n$ can be used to cancel out the undesired portion of the original V.G.F. at the next measure point a distance $d$ higher in the borehole. Looking at FIGURE 3, this next higher position in the investigating apparatus position $P_0$ with a corresponding V.G.F. $G_0$, the measure point $S^\circ_{n+1}$ being opposite the $n+1$th earth slab having a conductivity $\sigma_{n+1}$. The computed signal $C_n$ written into memory 32 when the investigating apparatus was at position $P_1$ is at read-out point 32c when the investigating apparatus is at position $P_0$. Remembering that this computed signal $C_n$ corresponds to the investigating apparatus having a V.G.F. of vertical extent $d$ (i.e. the vertical extent of V.G.F. portion A of $G_1$), it can be seen that the V.G.F. component corresponding to this computed signal $C_n$ will cancel out the V.G.F. component corresponding to the signal contributed by the B portion of V.G.F. $G_0$, leaving only the V.G.F. corresponding to the signal contributed by the A portion of V.G.F. $G_0$. This procedure is then, continued throughout the remainder of the borehole.

For purposes of nomenclature, the subscript $n$ will refer to the measure or depth point corresponding to the final computed signal $C_n$. Thus, in the FIGURE 1 apparatus, the derived signal $S_n$ has the same depth or measure point $S^o{}_n$ as the computed signal measure point $C^o{}_n$.

Figure 6A:
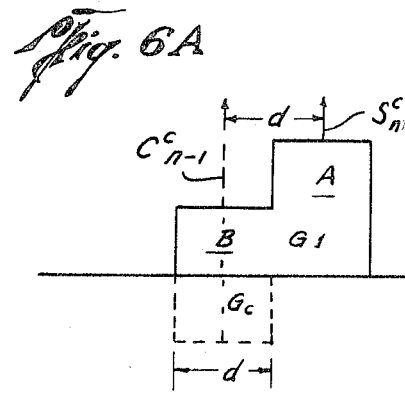
FIGURE 6(a) represents the V.G.F. of FIGURE 2 for the purpose of explaining how to design apparatus to process well logging measurements, given a specified V.G.F.
Figure 6B:
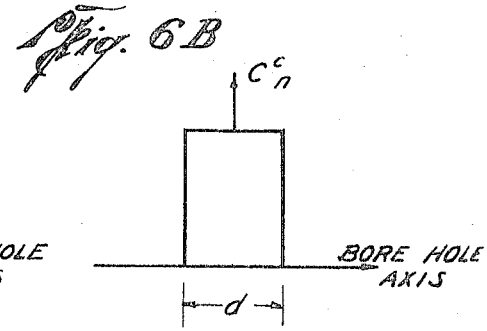
FIGURE 6(b) represents the V.G.F. resulting from the processed well logging measurements of FIGURE 6(a)

Now referring to FIGURE 6(a), there is shown the V.G.F. $G_1$ having portions A and B of vertical extent $d$. (A and B standing for the areas of the two portions). FIGURE 6(b) shows the computed V.G.F., designated $G_c$ likewise having vertical extent $d$. By using the computed signal $C_{n-1}$ a distance $d$ downhole (to the left in FIGURES 6(a) and 6(b) corresponding to the computed V.G.F. $G_c$ of FIGURE 6(b), shown in FIGURE 6(a) as the dotted line V.G.F. portion $G_c$, the B portion of the original V.G.F. of FIGURE 6(a) is cancelled out.

It can be seen that there are certain vertical points on the original V.G.F. where the center or measure point of the component V.G.F.'s are combined with the original investigating apparatus V.G.F. to produce the new computed V.G.F. These measure or depth points on the original V.G.F. curve corresponding to the depth points where the computation takes place are designated by the symbol $c$, and hereinafter, are called "computing stations." Thus, FIGURE 6(a) shows two computing stations, designated $S^c{}_n$ and $C^c{}_{n-1}$. $S^c{}_n$ is the computing station where the signal $S_n$ is derived and $C^c{}_{n-1}$ is the computing station corresponding to the computed signal $C_{n-1}$, which is a distance $d$ downhole (to the left) in FIGURE 6(a) from computing station $S^c{}_n$. These computing stations are useful in designing the signal processing apparatus to be used with a given original V.G.F. In FIGURE 6(a), for example, the computing stations $S^c{}_n$ and $C^c{}_{n-1}$ designate the fact that the computed signal $C_n$ which is stored in memory when the investigating apparatus center point O was a distance $d$ downhole, must be combined with the new derived signad to provide the new computed signal.

A technique can now be laid down for providing a computed V.G.F. of narrow vertical extent and locating the positions (vertically) of the computing stations by manipulating V.G.F.'s. Given a specified original V.G.F., portions of that original V.G.F. can be cancelled out to provide a computed V.G.F. However, to cancel out the undesired portions of the original V.G.F. in the first place, the computed V.G.F. itself must be located at desired computing stations with desired weights to provide the computed V.G.F. (In apparatus terms, this is merely saying that the stored computed signals ($C_{n-1}$ in FIGURES 1 and 6), corresponding to the computed V.G.F., are combined with the derived signal $S_n$, corresponding to the original V.G.F., to provide the new computed signal $C_n$, corresponding to the computed V.G.F.)

Another way to look at this technique is to break up the original V.G.F. into component V.G.F.'s (In FIGURE 6(a) 2 component V.G.F.'s A and B) having the same shape and vertical (borehole axis) extend, but having desired magnitudes and polarities which are not necessarily equal. Then considering one of the component V.G.F.'s (usually the component V.G.F. of greater area) as the final computed V.G.F., the remaining component V.G.F.'s are used to cancel out portions of the original V.G.F. to leave the resulting computed V.G.F. Thus, in FIGURE 6(a), the original V.G.F. $G_1$ is broken down into the components having areas A and B. The component with area B is then cancelled out to leave the component with area A, i.e., the computed V.G.F.

Figure 7A:
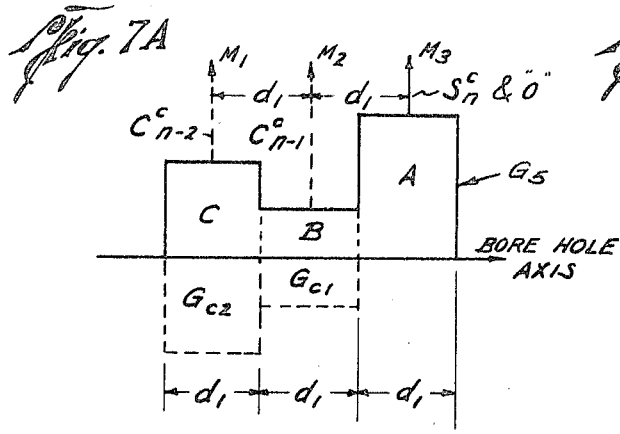
FIGURE 7(a) shows another original V.G.F. of a downhole investigating apparatus along with representation of how the effective vertical response of the investigating apparatus can be improved.

Referring now to FIGURE 7(a), there is shown another V.G.F. $G_5$ having three component parts A, B, and C (A, B, and C also designate their areas) having equal vertical (again vertical is the borehole axis) lengths each equal to $d$. The areas A and B are not necessarily the same magnitude as the areas A and B of FIGURE 6(a). In FIGURE 7(a), area A is greater than areas B and C and area C is larger than area B. The equation for the derived signal at the $n$th earth slab for the V.G.F. of FIGURE 7(a) can be written as:

$$S_n = A\sigma_n + B\sigma_{n-1} + C\sigma_{n-2} \qquad (21)$$

where $\sigma_n$ is the conductivity of the earth formation slab which is opposite that portion A of the V.G.F. with an area A, $\sigma_{n-1}$ is the conductivity opposite that portion B of the V.G.F. with an area B, and $\sigma_{n-2}$ is the conductivity of the earth formation slab opposite that portion C of the V.G.F. with an area C and the derived signal $S_n$ is the signal produced from the original V.G.F. $G_5$ of FIGURE 7(a). As the investigating apparatus moves up the borehole, it can be seen that the equations for the received signals at the different depths in the borehole can be written in a manner similar to Equations 1–4. Thus, the relationship for the received signal $S_{n-1}$ when the investigating apparatus center point is opposite the earth formation slab $n-1$ can be written as:

$$S_{n-1} = A\sigma_{n-1} + B\sigma_{n-2} C\sigma_{n-3} \qquad (22)$$

It can be seen that the remainder of the equations for the received signals can be written in this manner.

Figure 7B:
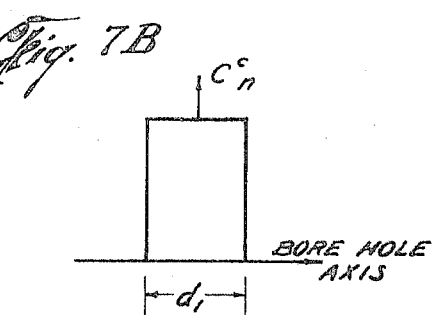
FIGURE 7(b) shows the resultant V.G.F. resulting from the procedure represented in FIGURE 7(a)

In the same manner as the computed signals for the two part geometrical factor of FIGURES 2 and 3 were derived (Equations 5–12), the equations for the computed signal for the three part geometrical factor can be written as follows:

$$C_n = \frac{1}{A}S_n - \frac{B}{A}C_{n-1} - \frac{C}{A}C_{n-2} \qquad (23)$$

$$C_{n-1} = \frac{1}{A}S_{n-1} - \frac{B}{A}C_{n-2} - \frac{C}{A}C_{n-3} \qquad (24)$$

where $C_n$ corresponds to the computed signal for the $n$th slab, $C_{n-1}$ corresponds to the computed signal for the $C_{n-1}$ slab, etc. These equations can be combined in the same manner as the equations for the two part geometrical factors were combined to arrive at an equation for $C_n$. Again, $A+B+C$ equals 1 for normalization. When this is done, it can be seen that the same type of results will be obtained. That is to say, the V.G.F. portions having areas B and C will be eliminated, thus leaving a V.G.F. as shown in FIGURE 7(b).

The computing stations for the V.G.F. of FIGURE 7(a) are designated $S^c{}_n$, $C^c{}_{n-1}$, and $C^c{}_{n-2}$ in accordance with the prescribed nomenclature, which computing stations are an equal distance $d_1$ apart. Now, remembering that the computed V.G.F. placed at desired computing stations can be used to cancel out undesired portions of the original V.G.F., the computed V.G.F. of FIGURE 7(b) is placed at computing stations $C^c{}_{n-1}$ and $C^c{}_{n-2}$ in FIGURE 7(a), with the proper weights, to cancel out the undesired portions B and C of original V.G.F. $G_5$. (When speaking of V.G.F.'s being placed, this concerns how to determine the location of the computing stations by manipulation of the V.G.F.'s following the teaching of the present invention that, given an original V.G.F., undesired portions of that original V.G.F. can be cancelled out by the computed V.G.F.)

These computed V.G.F.'s after weighting, are shown as the negative dotted line component V.G.F.'s $G_{c1}$ and $G_{c2}$. Thus, in FIGURE 7(b), there are three computing stations, $S^c{}_n$ corresponding to the depth or measure point where derived signal $S_n$ is obtained ($S_n$ corresponding to V.G.F. $G_5$), $C^c{}_{n-1}$ corresponding to the measure point where $C_{n-1}$ is obtained ($C_{n-1}$ corresponds to V.G.F. $G_{c1}$), and $C^c{}_{n-2}$ corresponding to the measure point where $C_{n-2}$ is obtained ($C_{n-2}$ corresponding to V.G.F. $G_{c2}$). The weights for the V.G.F. components are given in Equation 23.

Now referring to FIGURE 8, there is shown apparatus for performing the function depicted in FIGURES 7(a)

and 7(b), which is to solve Equation 23 for $C_n$. The derived well logging signal $S_n$ from the downhole investigating apparatus is supplied to weighted adding circuit 40 having weighting function circuits 40a, 40b, and 40c, which have weighting functions of $-B/A$, $+1/A$, and $-C/A$, respectively. These weighting circuits operate in the same general manner as the circuits in weighted adding circuit 34 of FIGURE 1, each circuit providing the desired weighting function. Weighting circuit 40a, includes a polarity reversing amplifier 41 whose output is connected to resistor 42, weighting circuit 40b includes an amplifier 43 (no polarity reversal) whose output is connected to a resistor 44, and weighting circuit 40c includes a polarity reversing amplifier 45 whose output is connected to a resistor 46. Resistors 42, 44 and 46 are all connected through a resistor 47 to ground, resistors 42, 44 and 46 each having a relatively large resistance compared to resistor 47.

The junction of resistors 42, 44, 46 and 47, which comprises the output of weighted adding circuit 40, is supplied to the input of a write amplifier, having a high input impedance, whose low impedance output is connected to write-in point 49a of a rotating memory 49 considered rotating in a clockwise direction. Rotating memory 49 could comprise, for example a rotating capacitor memory like the one shown in FIGURE 4. Or, memory 49 could be any other type of memory mentioned in connection with memory 32 of FIGURE 1. A read-out point 49b, located a short clockwise interval (designated "recorder depth shift") from write-in point 49a, is connected to the high impedance input of a read-out amplifier 50, whose output is connected through the switch 44 to recorder 34. Recorder 34 is driven by shaft 37a and memory 49 is driven by a shaft 45b (same as shafts 37a and 45b of FIGURE 1). Located a clockwise interval $d_1$ corresponding to depth interval $d_1$ in FIGURE 7(a) from write-in point 49a, is a read-out point 49c which is supplied to the high impedance input of amplifier 41 of weighted adding circuit 40. The signal from read-out point 49c is the computed signal $C_{n-1}$. Located a clockwise interval $d_1$ from read-out point 49c is a read-out point 49d which is connected to the high impedance input of amplifier 45 of weighted adding circuit 40. The signal picked up by read-out point 49d is designated $C_{n-2}$.

Now, looking at FIGURES 7(a), 7(b), and 8 in conjunction it will be shown how the apparatus of FIGURE 8 performs the operation depicted in FIGURES 7(a) and 7(b). As a starting point, for discussion purposes, consider the computed signal $C_n$ which is written into memory 49 at write-in point 49a as being produced from the computed V.G.F. of FIGURE 7(b). Now, when the center or recording point O of the downhole investigating apparatus, which center point is the same point as the computing station $S_n{}^c$ in FIGURE 7(a) (remember that $S_n$ corresponds to the original V.G.F. $G_5$), is at the depth or measure point designated $m_1$ in FIGURE 7(a), a computed signal $C_n$ is written into memory 49 at write-in point 49a corresponding to the V.G.F. of FIGURE 7(b). (How $C_n$ is obtained will be discussed later.) Now, when the center point O of V.G.F. $G_5$ has moved upward a distance $d_1$ to the depth or measure point designated $m_2$ in FIGURE 7(a), the computed signal $C_n$ memorized at depth point $m_1$ is now at read-out point 49c, and now designated $C_{n-1}$, and the new computed signal $C_n$ is written into memory 49 at write-in point 49a.

Now, when the V.G.F. $G_5$ has moved upward another interval $d_1$ to the position shown in FIGURE 7(a) (measure or depth point $m_3$), the new desired signal $S_n$ corresponding to V.G.F. $G_5$ is supplied to the 1/A weighting circuit of weighted adding circuit 40, thus causing the contribution of $S_n$ to the new computed signal $C_n$ to be $$\frac{1}{A}S_n$$

The computed signals written into memory 49 when the center point O of V.G.F. $G_5$ was at depth or measure points $m_1$ and $m_2$ are now at read-out points 49d and 49c, respectively. The signals $C_{n-1}$ and $C_{n-2}$ at read-out points 49c and 49d, respectively, are weighted by the factors $-B/A$ and $-C/A$, thus contributing $$-\frac{B}{A}C_{n-1} \text{ and } -\frac{C}{A}C_{n-2}$$

respectively to the new computed signal $C_n$. Thus, the contributions of $S_n$, $C_{n-1}$, and $C_{n-2}$ to the new computed signal $C_n$ take the form of Equation 23. The computed V.G.F.'s from depth or measure points $m_1$ and $m_2$, after weighting, are the V.G.F.'s $G_{c2}$ and $G_{c1}$, respectively, in FIGURE 7(a), thus producing the computed V.G.F. of FIGURE 7(b). The apparatus of FIGURE 8 is started at the bottom of the borehole in the same manner as the FIGURE 1 apparatus. That is, rotating memory 49 is rotated while the downhole investigating apparatus remains stationary at the bottom of the borehole and supplying the derived signal $S_n$ to the surface of the earth. Switch 44 is open during this time.

The above analysis is not limited to V.G.F.'s having rectangular shapes only. It can be utilized with V.G.F.'s of any shape. FIGURE 9(a) shows V.G.F. components having shapes other than rectangular. The solid line shape $G_6$ is the original or uncomputed V.G.F. $G_6$ of the downhole investigating apparatus and triangles $G_{c3}$, $G_{c4}$, and $G_{c5}$ having areas B, C, and A respectively are the component V.G.F.'s of original V.G.F. $G_6$. Remembering that the shapes of the component V.G.F.'s $G_{c3}$, $G_{c4}$, and $G_{c5}$ should be the same as the final computed V.G.F., but not necessarily the same magnitude the bases of the triangles of component V.G.F.'s $G_{c3}$, $G_{c4}$, and $G_{c5}$ are made equal to $d_2$. Now, component V.G.F.'s $G_{c3}$ and $G_{c4}$ are subtracted from the original V.G.F. $G_6$, leaving the component V.G.F. $G_{c5}$. (The component V.G.F.'s $G_{c3}$ and $G_{c4}$ are shown upright to more clearly show how they combine to cancel out all portions of the original V.G.F. $G_6$ to leave component V.G.F. $G_{c5}$.) This is the computed V.G.F. and is reproduced in FIGURE 9(b). Thus, it can be seen that the original V.G.F. can be broken up into component V.G.F.'s having the same shape and vertical extent, though not necessarily magnitude, and one of the component V.G.F.'s (usually the leading (uphole) one) being the new computed V.G.F., by using the other component V.G.F.'s to cancel out all of the original V.G.F. except for the resulting computed V.G.F.

Now, to determine where the location of the computing stations are, a similar point on each component V.G.F. is selected, such as in this case, the peaks of triangles $G_{c3}$, $G_{c4}$ and $G_{c5}$. This is keeping in line with the techniques for determining the center or recording point (i.e. one-half of the integrated V.G.F.). Remembering that the center point O for the original V.G.F. corresponding to the derived signal $S_n$ should be at the center point O of the final resulting computed V.G.F. (in this case V.G.F. $G_{c5}$), the center point of the original V.G.F. $G_6$ is at the peak of V.G.F. triangle $G_{c5}$. Since this point is also the computing station, it is designated $S_n{}^c$. The computing stations $C^c{}_{n-1}$ and $C^c{}_{n-2}$ are likewise, at the peaks of V.G.F. triangles $G_{c3}$ and $G_{c4}$ respectively. The distance between stations $S^c{}_n$, $C^c{}_{n-1}$, and $C^c{}_{n-2}$ are equal to $d_2$ in FIGURE 9(a), where $C^c{}_{n-1}$ and $C^c{}_{n-2}$ are the computing stations for computed signals $C_{n-1}$ and $C_{n-2}$ respectively.

The apparatus for performing the operation depicted in FIGURE 9(a) would be the same as the FIGURE 8 apparatus, and Equation 23 would apply. The only difference would be that the numerical values of the weighting functions $1/A$, $-B/A$, and $-C/A$ may be different depending on the magnitude of the areas of V.G.F. triangles A, B and C of FIGURE 9(a). The read-out points 49c and 49d would be distances $d_2$ and $2d_2$ respectively from write-in point 49a of rotating memory 49. For this reason, it is thought to be unnecessary to show the apparatus for performing the FIGURE 9(a) operation.

It is to be noted here that the earth formation slabs $n$, $n-1$, etc. in FIGURE 3, shown for derivation purposes, were adjacent one another and the computed signals $C_n$, $C_{n-1}$, etc. corresponded with these slabs. The fact that the slabs were adjacent resulted from the fact that the component V.G.F.'s did not overlap since they were rectangular. However, in the FIGURE 9(a) case, the component V.G.F.'s do overlap and thus the earth slabs can be considered to be overlapped to correspond with the component V.G.F.'s. That is to say, each component V.G.F. is responsive to the earth formation slab opposite it, i.e., the earth formation interval $d_2$ in FIGURE 9(a).

Looking now at FIGURE 10(a), there is shown another original V.G.F. $G_7$ (the solid line portion). The original V.G.F. $G_7$ can be broken up into component V.G.F. triangles, all having the same shape and vertical (borehole axis) extent $d_4$. The component V.G.F.'s are designated $G_{c6}$, whose computing station (peak of the triangle) is designated $C_{n-1}{}^c$; $G_{c7}$, whose computing station is designated $C_{n-2}{}^c$; $G_{c8}$, whose computing station is designated $C_{n-3}{}^c$; $G_{c9}$ whose computing station is designated $S_n{}^c$. As in FIGURE 9(a), the component V.G.F. triangles $G_{c6}$, $G_{c7}$, and $G_{c8}$ are inverted to more clearly show how they cancel out portions of the original V.G.F. $G_7$ ($G_{c8}$ is shown as a dotted line within the corresponding portion of the original V.G.F. $G_7$). Thus, component V.G.F. triangles $G_{c6}$ and $G_{c7}$ are subtracted from the original V.G.F. $G_7$ and component V.G.F. triangle $G_{c8}$ is added thereto, to leave the resulting component V.G.F. triangle $G_{c9}$, which is shown in FIGURE 10(b) as the computed V.G.F. The component V.G.F. triangles $G_{c6}$, $G_{c7}$, $G_{c8}$, and $G_{c9}$ have areas designated B, C, D and A, respectively. The equation for the computed signal $C_n$ corresponding to component V.G.F. triangle $G_{c9}$ is:

$$C_n = \frac{1}{A}S_n - \frac{B}{A}C_{n-1} - \frac{C}{A}C_{n-2} + \frac{D}{A}C_{n-3} \qquad (25)$$

where $A+B+C-D=1$ for normalization and $C_{n-1}$, $C_{n-2}$, and $C_{n-3}$, are the computed signals produced by component V.G.F. triangles $G_{c6}$, $G_{c7}$, and $G_{c8}$, respectively. Equation 25 could be derived in the same manner as Equation 9 for the two part V.G.F. was derived. The interval between computing stations $S_n{}^c$, $C_{n-1}{}^c$, and $C_{n-2}{}^c$ is $d_5$ and the interval between computing stations $C_{n-2}{}^c$ and $C_{n-3}{}^c$ is $d_6$.

Now referring to FIGURE 11, there is shown apparatus for performing the operation depicted in FIGURE 10(a). The derived signal $S_n$ from the downhole investigating apparatus is supplied to the input of an amplifier 51 of a weighting circuit 52a of a weighted adding circuit 52. Weighting circuit 52a has a weight of $1/A$. The output of amplifier 51 is connected through a resistor 53 and a resistor 54 to ground. The nongrounded side of resistor 54, comprising the output $C_n$ of weighted adding network 52 is supplied to the high impedance input of a write amplifier, whose low impedance output is connected to a write-in point 55a of a rotating memory 55. Rotating memory 55 is of the same type as the rotating memories 32 and 49 of FIGURES 1 and 8.

Located a clockwise interval corresponding to the recorder depth shift, is a read-out point 55b which supplies the computed signal $C_{n-1}$ to the high impedance input of a read-out amplifier 56, whose output is supplied to recorder 34. Recorder 34 and rotating memory 55 are driven by shafts 37a and 45b in the same manner as in FIGURE 1. Located a clockwise distance $d_5$ (corresponding to $d_5$ in FIGURE 10(a)) is a read-out point 55c which is connected to a high impedance input, polarity inverting amplifier 57 whose output is connected through a resistor 58 to the nongrounded side of resistor 54. Amplifier 57 and resistor 58 comprise a weighting circuit 52b, having a weight of $-B/A$. Located a clockwise distance $d_5$ from read-out point 55d, which supplies the computed signal $C_{n-2}$ to a high impedance input of a polarity inverting amplifier 59 whose output is connected through a resistor 60 to the non-grounded side of resistor 54. Amplifier 59 and resistor 60 comprise a weighting circuit 52c of weight $-C/A$. Located a clockwise distance $d_6$ from read-out point 55d is a read-out point 55e, which supplies the computed signal $C_{n-3}$ to the high impedance input of an amplifier 61 (no polarity reversal) whose output is connected to the non-grounded side of resistor 54. Amplifier 61 and resistor 62 comprises a weighting circuit of weight $+D/A$. Resistors 53, 58, 60 and 62 have high impedances compared to resistor 54 in the FIGURES 1 and 8 cases.

Now, referring to FIGURES 10(a) and 11 in conjunction, it can be seen that the computed signal $C_n$ written into memory 55 at different depth or measure points are read out after the downhole investigating apparatus has traveled distances of $d_5$, $2d_5$, and $2d_5+d_6$ corresponding to computing stations $C_{n-1}{}^c$ (computed signal $C_{n-1}$), $C_{n-2}{}^c$ (computed signal $C_{n-2}$) and $C_{n-3}{}^c$ (computed signal $C_{n-3}$), respectively, to provide the new computed signal $C_n$ in accordance with Equation 25. To obtain the initial values in memory 55 when the investigating apparatus is at the bottom of the borehole, switch 44 is opened, and shaft 45b is rotated while the derived signal $S_n$ is applied to weighted adding circuit 52, in the same manner as in the FIGURE 1 apparatus.

Now referring to FIGURE 12, there is shown another embodiment of the present invention wherein the downhole investigating apparatus comprises an induction logging tool and the well logging measurement processing circuitry utilizes five computing stations. The downhole investigating apparatus 64 comprises an elongated central support member 65 which supports a plurality of coils, designated T, $R_1$ and $R_2$, which are aligned coaxially with the central support member 65. The investigating apparatus 64 is supported by a cable 64a which passes to the surface of the earth. The downhole electronics are contained within a fluid-tight housing within the central support member 65, which is designated by the dotted line box 65a.

A signal generator 66 supplies a constant current signal to the transmitter coil T. This current travels through a resistor 67 of relatively low resistance. The receiver coils $R_1$ and $R_2$ are serially, but opposite-polarity connected to phase selective circuits 68 of known design. The voltage developed across resistor 67, which is in-phase with the current supplied to transmitter coil T, is supplied to the phase selective circuits 68 as a phase-reference signal. These phase selective circuits supply a varying DC ouput signal $S_n$, proportional to the measured conductivity, via a conductor pair 69 to the surface of the earth. Actually, the conductor pair 69 is located within the armored multiconductor cable 64a, but is shown separately for reasons of clarity of the electrical diagram.

At the surface of the earth, this conductor pair 69 is supplied to the input of a non-inverting amplifier 76 within a weighted adding network 71, which amplifier 76 references the derived well logging signal $S_n$ to the surface ground reference potential. Amplifier 76 could be a differential amplifier, for example. The output from amplifier 76 is supplied through a resistor 77 and a resistor 72 to ground. Amplifier 76 and resistor 77 comprise a weighting circuit 71b of weighted adding circuit 71, having a weight $1/A$. The output from weighted adding circuit 71 is supplied to the high impedance input of a write amplifier 72a. The output of write amplifier 72a is connected to the write-in point 73a of a rotating memory 73, of the same type as the rotating memories of FIGURES 1, 8 and 11. This rotating memory 73 rotates in a clockwise direction in FIGURE 12. Distances around the periphery of memory device 73 correspond to depth intervals in the borehole since rotating memory 73 is driven by shaft 45b which is responsive to the travel of downhole investigating apparatus 64, as in the FIGURE 1 apparatus.

Located a clockwise interval corresponding to the "recorder depth shift" from write-in point 73a is a read-out point designated 73b. This read-out point 73b is connected through switch 44 to the input of a high input impedance read-out amplifier 74, whose output is supplied to the input of a skin-effect function former 75, which corrects for electrical skin effect in accordance with the teachings of U.S. Patent No. 3,226,633 granted to W. P. Schneider on Dec. 28, 1965. The output of function former 75 is connected to the input of recorder 34, whose recording medium is driven by shaft 37a as in the FIGURE 1 apparatus. At a second point on the circumference of rotating memory 73, located a distance $d_8$ in a clockwise direction from the write-in point 73a, is a read-out point 73c which supplies the computed signal $C_{n-1}$ to the input of a high input impedance, polarity inverting amplifier 76. The output from amplifier 76 is supplied through a resistor 76a to the non-grounded side of resistor 72. Amplifier 76 and resistor 76a comprise a weighting circuit 71a of weighted adding network 71, having a weight of $-B/A$.

Located a clockwise interval $d_9$ from read-out point 73c is a read-out point 73d, which supplies a computed signal $C_{n-2}$ to the high impedance input of a polarity inverting amplifier 78. The output of amplifier 78 is connected through a resistor 79 to the non-grounded side of resistor 72. Amplifier 78 and resistor 79 comprise a weighting network 71c of weighted adding network 71, having a weight of $-C/A$. Located a clockwise interval $d_{10}$ from read-out point 73d is a read-out point 73e, which supplies the computed signal $C_{n-3}$ to the high impedance input of a polarity inverting amplifier 80. The output of amplifier 80 is connected through a resistor 81 to the non-grounded side of resistor 72. The amplifier 80 and resistor 81 comprise a weighting circuit 71d of weighted adding network 71, having a weight of $-D/A$.

Located a clockwise distance $d_{11}$ from read-out point 73e is a read-out point 73f, which supplies the computed signal $C_{n-4}$ to the high impedance input of a polarity inverting amplifier 82. The output of amplifier 82 is connected through a resistor 83 to the non-grounded side of resistor 73. Amplifier 82 and resistor 83 comprise a weighting circuit 71e of weighted adding network 71, having a weight $-E/A$. The resistances of resistors 70a, 77, 79, 81 and 83 are much greater than the resistance of resistor 72 for the same reasons as in the FIGURE 1 weighting circuit.

Before proceeding with the operation of the FIGURE 12 apparatus, it would be desirable to examine the V.G.F. of the induction coil system of FIGURE 12. This coil system shown in FIGURE 12 is basically the same coil system as shown in FIGURE 11 (the corresponding V.G.F. is shown in FIGURE 12) of the Doll Patent No. 3,166,709, previously mentioned. Now, referring to FIGURE 13(a), the original V.G.F. for this coil system is shown in FIGURE 13(a) as the solid line V.G.F. $G_8$. The signal $S_n$ from the downhole investigating apparatus 64 corresponds to this V.G.F. $G_8$. Now utilizing the same teachings as previously shown in determining the computing stations, and weights and polarities thereof for FIGURES 6(a), 7(a), 9(a) and 10(a), the original V.G.F. is broken down into component V.G.F.'s designated $G_{c10}$, $G_{c11}$, $G_{c12}$, $G_{c13}$, and $G_{c14}$. (Note that the front or uphole (to the right in FIGURE 13(a)) tail of the component V.G.F.'s does not immediately return to zero response. However, the distance $d_7$ was picked by extending or extrapolating the front portion of the component V.G.F.'s to zero, just for the purpose of showing that the vertical distance of all of the components V.G.F.'s are equal) all having the same shape, and vertical extent $d_7$, but not all having the same magnitude. These component V.G.F.'s have areas designated B, C, D, E, and A, respectively, and computing stations designated $C^c_{n-1}$, $C^c_{n-2}$, $C^c_{n-3}$, $C^c_{n-4}$, and $S^c_n$, respectively. The depth intervals between the computing stations are $d_8$ between $S^c_n$ and $C^c_{n-1}$, $d_9$ between $C^c_{n-1}$ and $C^c_{n-2}$ $d_{10}$ between $C^c_{n-2}$ and $C^c_{n-3}$, and $d_{11}$ between $C^c_{n-3}$ and $C^c_{n-4}$. Now, by subtracting component V.G.F.'s $G_{c10}$, $G_{c11}$, $G_{c12}$, and $G_{c13}$ from the original V.G.F. $G_8$, the component V.G.F. $G_{c14}$ remains. This is the computed V.G.F. shown in FIGURE 13(b). FIGURE 13(b) is lined up vertically on the paper, showing that the depth point corresponding to computing station $S^c_n$ of the original V.G.C. $G_8$ is the same as the depth point of the computed V.G.F. $G_{c14}$.

Now concerning how the apparatus of FIGURE 12 carries out the operation as depicted in FIGURES 13(a) and 13(b), the distances $d_8$, $d_9$, $d_{10}$ and $d_{11}$ between the computing stations $S^c_n$, $C^c_{n-1}$, $C^c_{n-2}$, and $C^c_{n-3}$, in FIGURE 13(a) determine the read-out points from the rotating memory device 73. The write-in point 73(a) corresponds to the computing station $S^c_n$ in FIGURE 13(a) since computing station $S^c_n$ corresponds to the derived signal $S_n$. The read-out points 73c, 73d, 73e, and 73f are displaced distances of $d_8$, $d_8+d_9$, $d_8+d_9+d_{10}$, and $d_8+d_9+d_{10}+d_{11}$, respectively, from write-in point 73a. These write-in and read-out points are positioned such that at the same instant of time, five signals obtained at five different depth or measure levels in the borehole are supplied to the input of the weighted adding circuit 71. Thse five signals comprise the well logging signal $S_n$ being presently derived, which corresponds to the V.G.F. $G_8$, a first computed signal $C_{n-1}$ from read-out point 73c corresponding to the V.G.F. $G_{c10}$ at computing station $C^c_{n-1}$, a second computed signal $C_{n-2}$ from read-out point 73d corresponding to the V.G.F. $G_{c11}$ at computing station $C^c_{n-2}$, a third computed signal $C_{n-3}$ from read-out point 73e corresponding to V.G.F. $G_{c12}$ at computing station $C^c_{n-3}$, and a fourth computed signal $C_{n-4}$ from read-out point 73f corresponding to V.G.F. $G_{c13}$ at computing station $C^c_{n-4}$. These five signals are multiplied by the respective weights $+1/A$, $-B/A$, $-C/A$, $-D/A$, and $-E/A$.

Now, multiplying each of these five signals times their respective weighting functions, the equation for the new computed signal $C_n$ at the depth point where $S_n$ is being presently derived can be written as:

$$C_n = \frac{1}{A}S_n - \frac{B}{A}C_{n-1} - \frac{C}{A}C_{n-2} - \frac{D}{A}C_{n-3} - \frac{E}{A}C_{n-4} \quad (26)$$

Equation 26 could just as well have been derived in the same manner as Equation 9 for the two part V.G.F. was derived. At any rate, it can now be seen that any number of computing stations can be utilized, and the areas of the component V.G.F.'s used to determine the weighting functions. Thus, if more than five computing stations were utilized, Equation 26 would then continue in accordance with $$\pm \frac{E_1}{A}C_{n-5}, \pm \frac{E_2}{A}C_{n-6}$$

etc. where $E_1$ and $E_2$ are the areas of the new component V.G.F.'s and $C_{n-5}$ and $C_{n-6}$ are the stored computed signals which are supplied to the weighted adding network. Additionally, it is to be understood that while, in the various embodiments, the peak heights of the component V.G.F.'s have been shown as equal to the height of the original V.G.F. at the vertical point where the peak heights occur, the peak height could just as well be higher or lower, if desired. In this event, there would be a portion of the original V.G.F. not cancelled, which could perhaps be cancelled out by the desired location of another computing station. This other computing station could be of the type discussed above or the type disclosed in the above mentioned Doll patent. The requirement for this may occur if the shape of the original V.G.F. is complex enough.

Thus it can be seen that the computed signal $C_n$ is developed at the output of weighted adding circuit 71 in accordance with Equation 26. This computed signal $C_n$ is then written into the rotating memory 73 as the new computed signal $C_n$. The computed signal $C_n$ is shown being read-out to recorder 63 at point 73a which is located a short distance on the clockwise side of point 58a. This read-out to recorder 34 could be at any read-out point so long as the recorder depth indications are set to correspond therewith (i.e. the recorder depth shift). To get the FIGURE 12 apparatus started at the bottom of the borehole, rotating memory 73 is rotated by way of shaft 45a while the downhole investigating apparatus 64 remains stationary at the bottom of the borehole while supplying the derived signal $S_n$ to the surface of the earth, similar to the FIGURE 1 case. Switch 44 is open during this time.

It has been assumed in the preceding discussion that the rotating memories 32, 49, 55 and 73 of FIGURES 1, 8, 11 and 12 have always had a memory station opposite a write-in or read-out point at the proper time for processing the derived well logging signals in the desired manner. In the case of a magnetic memory, there would be an infinite number of memory stations since a signal can be stored at every infinitesimal point on the magnetic memory and the above assumption would always be correct. However, in the case of a capacitor memory, as shown in FIGURE 4, or in the case of a digital computer where the well logging signals would be digitalized at given depth points as the investigating apparatus moves up the borehole, it may not be desirable to store a voltage reading at every infinitesimal depth point. Thus, a rule will now be formulated for determining at what depth interval the well logging signals should be sampled and the resulting computed signals stored. Since, in the embodiments shown, the presently derived signals $S_n$ is supplied to the weighted adding network 71 along with the previous stored computed signals, the sample and memory stations will coincide. That is to say, in the preceding embodiments, each time (and at no other time) the derived signal $S_n$ is sampled, there will need to be a memory station (e.g., a capacitor) to store the corresponding computed signal $C_n$ appearing at the output of weighted adding circuit 71.

The general rule for determining the maximum interval between sample and memory stations is to determine the lowest common denominator, designated LCD, of the distances between successive computing stations. Then, if more frequent sampling is desired, the interval between sample and memory stations can be determined by the relationship $$\frac{LCD}{N}$$

where N is an integer greater than zero. The total length of the memory (in terms of borehole depth) must be at least as large as the sum of the distance between successive computing stations (i.e. length of the first to last computing station), or longer, if desired.

Now, referring to FIGURE 4, there is shown the capacitor rotating memory discussed in connection with the rotating memory 32 of FIGURE 1. Each capacitor 38 comprises a memory station. Now, imaginatively inserting the FIGURE 4 capacitor memory into rotating memory 32 of FIGURE 1, it can be seen that each time a capacitor comes into contact with write-in point 32a (remember that the write-in and read-out points are stationary while the capacitors 38 and their associated contact points 38a rotate), the derived signal $S_n$ is sampled. That is to say, during the interval between the capacitors being in contact with write-in point 32a, $S_n$ is not being used. Thus, each time a capacitor or memory station is in contact with write-in point 32a, a capacitor should be in contact with read-out point 32c so that the computed signal $C_n$ will, in fact, be equal to $$\frac{1}{A}S_n - \frac{B}{A}C_{n-1}$$

It would be possible, though, to have suitable filtering of the read-out signal $C_{n-1}$ from read-out point 32c in FIGURE 1 (or the plurality of read-out points in other embodiments) so that the exact location of memory stations would not be so important.

In connection with the capacitor memory of FIGURE 4, the read-in amplifiers of the various disclosed embodiments should have low output impedances to allow the memory capacitors to quickly charge or discharge to the new voltage reading, and the read-out amplifiers should have high input impedances so as to draw negligible charge from the memory capacitors 38, thus maintaining the voltages on the memory capacitors relatively intact for further read-out. Again, it is to be pointed out that the capacitors could remain stationary and suitable switching circuits employed for selectively reading voltages into and out of the capacitors. However, the rotating memories have been disclosed in the various embodiments to make the theory of the invention easier to understand.

Now, taking examples of the location of sample and memory stations, in FIGURE 1, since there are only two computing stations a distance $d$ apart, the memory stations can be a distance $d$ apart and the total length of memory must be equal to at least $d$. Now, if more frequent sampling is desired, the memory and sample stations can be an interval $d/N$ apart, N being an integer greater than zero. Since it is generally undesirable to read in one voltage and read out another voltage from a capacitor at the same time, the total length of memory should be equal to the minimum possible length of memory, $d$ in this case, plus at least one additional memory station. This is the situation shown in FIGURE 1, where read-out point 32c is located counterclockwise a given interval from write-in point 32a. Giving a numerical example of the above, assume $d=20$ inches, then the relative interval between sample and memory stations could correspond to 20, 10, 6⅔, 5, 3⅓, 2⁶⁄₇ inches, etc., in the borehole.

The same procedure is followed in connection with the other embodiments. Thus, in FIGURE 8, the lowest common denominator is $d_1$ and the total length of memory should be at least $2d_1$. The interval between memory and sample station could then be $d/N$ where N is an integer greater than zero.

Now, taking an example of this technique to determine the distance between sample and memory stations where the intervals between computing stations are not equal, if in the FIGURE 12 embodiment, the distance $d_8$ is equal to 20 inches, $d_9$ is equal to 20 inches, $d_{10}$ is equal to 35 inches, and $d_{11}$ is equal to 35 inches, it is seen that the number 5 is the lowest common denominator of these distances. Thus, if the sample and memory stations are set 5 inches apart (in terms of borehole depth), the memory stations will be positioned such as to insure that a memory station is in contact with the respective write-in and read-out points at the proper time.

To provide for more frequent sampling, the memory stations should be at intervals of $5/N$ where N is an integer greater than 0. Thus, the derived well logging measurements could be sampled every 2½ inches, every 2⅔ inches, etc., if closer sampling is desired. Also, remembering that the memory is to be long enough so that all of the memorized computed values can be added to the well logging measurement $S_n$ being currently sampled, at the same time, the length of the memory must be equal to at least $d_8+d_9+d_{10}+d_{11}$ in this case. Using the values picked for $d_8$, $d_9$, $d_{10}$ and $d_{11}$, the total relative length of the memory will be proportional to a length of at least 100 inches in the borehole. Using the value of 5 inches between sampling stations, there would be at least 20 memory stations (e.g., capacitors) in the rotating memory. If it is desired to sample at more frequent intervals, then more memory stations can be added to the rotating memory in accordance with the relationship $$LCD/N$$

The apparatus described thus far has not allowed for the addition or subtracting of component V.G.F.'s from the leading or uphole portion of the original V.G.F. since only computed values are being utilized. One way to provide for alteration of the leading edge of the original V.G.F. is to utilize the techniques described in the previously named Doll Patent 3,166,709. To accomplish this, the original V.G.F. is added or subtracted in a desired manner at a given computing station.

Now referring to FIGURE 14(a), there is shown the original V.G.F. $G_8$ of FIGURE 7(a). This V.G.F. $G_8$ has a leading edge (right side of FIGURE 14(a) which does not go immediately to zero response. Now, by supplying a computing station of a different type on the uphole side of the V.G.F. $G_8$, it is possible to provide a new "prepared" V.G.F. having a more desired shape. To provide this new V.G.F., the derived signals $S_n$ from a plurality of depth points are combined in a desired relationship. Since the derived signal $S_n$ corresponds to the original V.G.F. this combining of derived signals is tantamount to combining the original V.G.F.'s at the different depth points. Thus, to determine what the new V.G.F. will be after this process, the original V.G.F., in this case V.G.F. $G_8$, is added or subtracted in a desired proportion or weight and at desired computing stations. The vertical extent and shape of the original V.G.F. remains the same and the weight is varied to achieve the desired results.

Thus, in FIGURE 14(a), a computing station $S^c_{n+1}$ is placed a distance $d_1$ in the uphole direction from the main computing station $S^c_n$. By placing the computing station $S^c_{n+1}$ a distance $d_{12}$ uphole from computing station $S^c_n$, this has the effect of placing the V.G.F. $G_9$, having the same shape as V.G.F. $G_8$ but a different weight, at computing station $S^c_{n+1}$. This V.G.F. $G_9$ is subtracted from original V.G.F. $G_8$ (V.G.F. $G_9$ is shown upright though, to more clearly show how it substantially cancels the undesired portion of V.G.F. $G_8$). V.G.F. $G_8$ has an area F and V.G.F. $G_9$ has an area G. FIGURE 14(b) shows the new "computed derived" or "prepared" V.G.F. $G_{10}$ after subtracting V.G.F. $G_9$ from V.G.F. $G_8$. The equation describing the operation depicted in FIGURE 14(b) is:

$$CS_n = FS_n - GS_{n-1} \qquad (27)$$

where $CS_n$ is the computed derived signal, and $S_n$ and $S_{n-1}$ are the derived signals corresponding to V.G.F.'s $G_8$ and $G_9$ respectively. Again F minus G should equal "one" for normalization. This new V.G.F. $G_{10}$ represents the prepared V.G.F. which is now ready for the computational process depicted in FIGURE 13(a). Note that the V.G.F.'s of FIGURES 14(a), 14(b), and 14(c) are lined up vertically on the paper, i.e., $S^c_n$, $CS^c_n$, and $C^c_n$ are lined up.

It would be desirable at this time illustrate another manner in which the weights can be determined. Since the shapes of the V.G.F.'s $G_8$ and $G_9$ in FIGURE 14(a) are the same, it is clear that their heights $f$ and $g$ respectively could be used to determine the weights since $f$ is proportional to the area F and $g$ is proportional to the area G. Thus, Equation 27 could be rewritten as:

$$CS_n = YfS_n - YgS_{n-1} \qquad (28)$$

where $Yf$ minus $Yg$ equals "one" for normalization, $Yf$ and $Yg$ being equal to F and G respectively. This procedure, using heights, can also be used to determine the weights of the various combined signals in the prior embodiments, e.g. FIGURE 13(a). This can be accomplished by initially assuming that the height of the component V.G.F. which is the resulting computed V.G.F. is equal to 1, and then finding the heights of the remaining component V.G.F.'s, which will be fractions. Next, all of the heights, except the height of the resulting computed V.G.F., are summed up. Then, the weight of the final computed V.G.F. components is loosed to a value to make the sum of the weights equal to 1. Looking at FIGURE 14(b) for an example of this, the heights $a$, $b$, $c$, $d'$, and $e$ of the component V.G.F.'s whose areas are A, B, C, D and E respectively are shown. These heights $a$, $b$, etc. also designate the location of the computing stations. Now, setting $a=1$, assume $b=\frac{2}{3}a$, $c=\frac{2}{3}a$, $d'=\frac{1}{9}a$, and $e=\frac{1}{9}a$, then, since $a=1$, $b=-\frac{2}{3}$, $c=-\frac{2}{3}$, $d'=-\frac{1}{9}$, and $e=-\frac{1}{9}$. Summing $b+c+d'+e$, we get $-(\frac{2}{3}+\frac{2}{3}+\frac{1}{9}+\frac{1}{9}) = -1\frac{5}{9}$. Thus, to make $a-b-c-d'-e=1$ $a$ must be equal $2\frac{5}{9}$.

After "preparing" the original V.G.F., the same procedure set forth in connection with FIGURES 13(a) and 13(b) is then utilized with the computed derived V.G.F. $G_{10}$ in FIGURE 14(b) to arrive at the new computed V.G.F. shown in FIGURE 14(c). That is to say, the undesired portions of computed samples signal $CS_n$ corresponding to V.G.F. $G_{10}$ of FIGURE 8 are cancelled by locating the computing station $CS_n{}^c$, $C_{n-1}{}^c$, $C_{n-2}{}^c$, $C_{n-3}{}^c$, and $C_{n-4}{}^c$ in the manner previously described. The relationship for the new computed value $C_n$ is:

$$C_n = \frac{1}{A}[FS_n - GS_{n+1}] - \frac{B}{A}C_{n-1} - \frac{C}{A}C_{n-2} - \frac{D}{A}C_{n-3} - \frac{E}{A}C_{n-4} \qquad (29)$$

where $C_{n-1}$ is the computed value at computing station $C_{n-1}{}^c$, $C_{n-2}$ is the computed value at computing station $C_{n-2}{}^c$, $C_{n-3}$ is the computed value at computing station $C_{n-3}{}^c$, and $C_{n-4}$ is the computed value at computing station $C_{n-4}{}^c$. $a$, $b$, $c$, $d$, and $e$ are the heights of the component V.G.F. portions $G_{c14}$, $G_{c10}$, $G_{c11}$, $G_{c12}$, and $G_{c13}$ respectively in FIGURE 13(a). For normalization $$\frac{1}{A} - \frac{B}{A} - \frac{C}{A} - \frac{D}{A} - \frac{E}{A}$$

must equal "one." The computed derived portion (F,G) of Equation 29 will, in addition, have its own normalizing constants as previosuly mentioned. Thus, it can be seen that a preliminary processing of a somewhat different character in accordance with the techniques shown in above named Doll patent can be utilized to prepare the original V.G.F. for the computing process represented FIGURE 13(a) and carried out by the apparatus of FIGURE 12.

It is to be understood that these preliminary computing stations can be located at any position, not just the uphole position shown in FIGURE 8 and can be positive or negative. Also, there can be as many of these computing stations as desired. Additionally, this computational process of the above named Doll patent could be performed after the computational process represented in FIGURES 12 and 13(a). In V.G.F. terms, this would have the effect of adding or subtracting the original V.G.F. to the resulting computed V.G.F. Additionally, the computational process described in the Doll patent could be performed both before and after the computational process of FIGURES 12 and 13(a).

Now, looking at FIGURE 15, there is shown apparatus for performing the operation depicted in FIGURES 14(a) and 14(b) to provide a computed signal $C_n$ corresponding to the computed V.G.F. in FIGURE 14(c). The derived signal designated $S_{n+1}$ from the downhole investigating apparatus is supplied to a write amplifier 84 having a low output impedance, which supplies the signal $S_{n+1}$ to a write-in point 84b of a rotating memory 84a and to the high impedance input of an amplifier $A_1$, whose output is connected through a resistor $R_1$ and a resistor $R_2$ to ground. Located a distance $d_{12}$ (corresponding to the borehole depth interval $d_{12}$ of FIGURE 14(a), from write-in point 84b is a read-out point 84c which supplies the derived signal $S_n$ to a high input impedance, polarity inverting amplifier $A_2$, whose output is connected through a resistor $R_3$ to the non-grounded side of resistor $R_2$.

Amplifier $A_1$ and resistor $R_1$ comprise a weighting circuit of weight F and amplifier $A_1$ and resistor $R_3$ comprise a weighting circuit of weight —G. The junction between resistors $R_1$, $R_2$ and $R_3$ is connected to a circuit which comprises the FIGURE 12 computer and recorder.

Now, concerning the operation of the FIGURE 15 apparatus, the derived signal $S_{n+1}$ and the derived signal $S_n$ read-out from memory 84a are combined in weighted adding circuit 84d in accordance with Equation 27 or 28 and the resulting computed derived signal $CS_n$ is supplied to the computer of FIGURE 12 where the mathematical operation of Equation 29 and FIGURE 14(b) is performed.

Thus, looking at FIGURES 14(a), 14(b), and 15, it can be seen that the derived signal $S_n$ is stored in memory 84a and read out a distance $d_{12}$ later to be combined with the derived signal $S_{n+1}$ in accordance with Equation 27 or 28 to provide the new computed derived signal $CS_n$ corresponding to the V.G.F. $G_{10}$ of FIGURE 14(b). Next this signal $CS_n$ is combined with the read-out computed signals $C_{n-1}$, $C_{n-2}$, $C_{n-3}$, and $C_{n-4}$ to provide the new computed signal $C_n$. It should be noted that the signal being presently derived is designated $S_{n+1}$ instead of $S_n$. This is to keep in line with previous nomenclature wherein the subscript $n$ denotes the computing station where the final resulting computed signal $C_n$ is positioned. Since in FIGURE 14(a)–14(c), the computed signal $C_n$ is located at the same computing station as $S_n^c$, the reason for the nomenclature in FIGURES 14(a) and 15 can be seen.

Now, referring to FIGURE 16, there is shown additional apparatus for preparing the original V.G.F. for the computing process, and then performing the computing process, as represented by FIGURES 14(a), 14(b) and 14(c). The apparatus of FIGURE 16 is a digital computer for accomplishing this function. The hatched double line connections shown in FIGURE 16 represent a plurality of conductors whereas the single lines represent single conductors. The ground designations are left off of the FIGURE 16 diagram for purposes of brevity, but are assumed to be present.

The derived well logging signal $S_{n+1}$ from the downhole investigating apparatus is supplied to an analog-to-digital converter 85 which receives a command to digitize signal A′ from an instruction sequencer 86. This derived signal $S_{n+1}$ could also be supplied from a tape recorder which has previously recorded the well logging signals as they were derived. This instruction sequencer is described in more detail in FIGURE 17. A depth pulse generating means 27 which could comprise for example, an optical slotted drum driven by the cable movement, supplies pulses to sequencer 86 at given intervals of travel of the downhole investigating apparatus. The digitized data word from analog-to-digital converter 85 is supplied in parallel form to a shift register 86a. The instruction sequencer 86 supplies a clock signal to shift register 86a to enable it to shift the bits out of register 86a in a serial fashion. The output of shift register 86a is supplied to a plurality of gates 87, the control signals to which are supplied from instruction sequencer 86. Thus, a separate conductor is supplied from instruction sequencer 86 to each gate of gates 87. The output from each one of the individual gate circuits of gates 87 are supplied to a separate input of a buffer memory 88. Each one of these separate inputs to buffer memory 88 represents the input to an individual word storage element within buffer memory 88, such as, for example, a delay line for each data word. A clock input to memory 88 is shown for enabling the circulating action.

The instruction sequencer 86 energizes a separate gate circuit within gates 87 at different selected times which controls the particular memory station within buffer memory 88 to which the particular word from shift register 86 is transferred. Each of the memory stations within buffer memory 88 is connected to gates 89 which receives its control signal from instruction sequencer 86. Gates 89 operates in the same manner as gates 86, that is, instruction sequencer 86 energizes a particular conductor which energizes a selected gate within gates 89 to allow a selected memory station within buffer memory 88 to be read out. This read-out from buffer memory 88 is likewise in serial fashion and the timing sequence from sequencer 86 is set to enable proper readout. The output from gates 89 is supplied to one input of an OR gate 90 whose output is supplied to the input of a shift register 91 which is also shifted by clock pulses from instruction sequencer 86. The output from shift register 91 is supplied to the input of an inhibit gate 92 which is energized by the K output from instruction sequencer 86. This output from shift register 91 is also recirculated back to the input of shift register 91 through a fixed time delay 92, an inhibit gate 93, and the OR gate 90. The inhibit gate 93 is energized by the G′ output of instruction sequencer 86. Delay 92 has a delay equal to the time for a bit to be shifted from one bit position to the next, i.e., a one bit delay.

The D′ output from instruction sequencer 86 is supplied through an OR gate 94, which merely isolates the various D′ outputs of instruction sequencer 86 from one another, to the reset input of a binary counter 95, through a capacitor 96 to the reset input of a flip-flop 97. The K output from instruction sequencer 86 is also supplied to the reset input of flip-flop 97. The binary counter 95 is energized through a scaler 98 which is energized by the clock of instruction sequencer 86. Scalar 98 performs the function of dividing the number of clock pulses by a constant. This constant is the capacity or number of bit positions of shift register 91. Scalar 98 could comprise, for example, a series of flip-flops. The output from binary counter 95 is supplied to gates 97, which is energized by the D output from instruction sequencer 86. Gates 97 operate in the same manner as gates 87 above described. Each one of the gates 97 is connected to a separate logic circuit within logic circuits 98. Logic circuits 98 comprise, for example, the standard diode logic for providing output signals at desired times. Thus, the D′ output of instruction sequencer 86 will energize a selected one of the gate circuits of gates 97 which will then connect a desired logic circuit to binary counter 95 so that a desired count sequence will be generated from the particular logic circuit of logic circuits 98 which is connected to binary counter 95. This generated count sequence is supplied to one input of an AND gate 99, the other input to AND gate 99 being supplied from the output of inhibit gate 92.

The output from AND gate 99 is supplied to the inputs of an inhibit gate 100 and a standard enable type gate 101. Both of these gates are energized from the one output of flip-flop 97, the set input of flip-flop 97 being supplied from an exclusive OR gate 102, the inputs to exclusive OR gates 102 being supplied from the sign bit position of shift register 91 (the highest order bit position) and from the sign bit position of logic circuits 98. The output from gate circuit 101 is supplied through an inverter 103 to one input of an OR gate 104, the other input being supplied from the output of inhibit gate 100. The output from OR gate 104 is supplied to one input of a full adder 105, the carry output from full adder 105 being supplied through a delay circuit 106, having a one bit delay, back to the carry input of full adder 105. The sum output S of full adder 105 is supplied to the input of an accumulator register 106, the output being supplied through an inhibit gate 107 back to the third input of full adder 105, through an enable type gate circuit 108 to the input of gates 109, and to the input or a digital tape recorder 113 and a digital-to-analog converter 113. Digital tape recorder 112 is stepped by the J output of sequencer 86. Inhibit gate 107 and gate 108 are energized from the I output of instruction sequencer 86. Gates 109 are energized from the H output of instruction sequencer 86 in the same manner as gates 87, etc.

The outputs from gates 109 are supplied to separate memory stations of another buffer member 110 which is energized by clock pulses from instruction sequencer 86 in the same manner as buffer memory 88. The memory stations of buffer memory 110 are supplied to gates 111 which are energized from the E' output of instruction sequencer 86, the particular gate circuit which is energized being determined by sequencer 86. The output of gates 111 is connected to the third input of OR gate 90. The output of digital-to-analog converter 113 is supplied to a standard analog type recorder 114 which can be drawn in the same manner as the recorder of FIGURE 1.

Before proceding with the operation of the FIGURE 16 apparatus, it would be desirable to look at FIGURE 17 which shows the internal circuitry of instruction sequencer 86 to understand the time sequence involved in the FIGURE 16 computer. A clock 120, which could comprise an astable multivibrator for example, drives a binary counter 121, the individual stages of which are connected to a suitable timing logic circuit 122 in the usual manner to provide output pulses at the desired times. The various times at which output pulses are generated from timing logic circuit 122 are represented as $t_1$, $t_2$, etc. The $t_1$ output is connected to the A output of instruction sequencer 86 and to the set input of a flip-flop 123 through a diode 124, the cathode side of diode 124 being connected through a forward biased diode 125 to the reset input of a flip-flop 126. The $t_2$ output is connected to the set input of a flip-filop 127 and through a forward biased diode 128 to the reset input of flip-flop 123 and through another forward biased diode 129 to the set input of flip-flop 126. The $t_3$ output is connected to the reset input of flip-flop 127. The $t_4$ output is connected to the anode of diode 125 and the set input of flip-flop 123. The $t_5$ output is connected to the anode of diode 129. The $t_6$, $t_8$, $t_{10}$ and $t_{12}$ outputs are connected through a diode 129a to the reset input of flip-flop 126 and to the set input of a flip-flop 129. The $t_7$, $t_9$, $t_{11}$ and $t_{13}$ outputs are connected to the reset input of flip-flop 129 and through a forward biased diode 130 to the set input of flip-flop 126. The $t_{14}$ output is connected to the set input of a flip-flop 131 and the $t_{15}$ output is connected to the set input of a flip-flop 132. The $t_{16}$ output is connected to the reset inputs of flip-flops 131 and 132, and the set input of flip-flop 140. The output of flip-flop 140 is connected to one input of an AND gate 133, the other input to AND gate 133 being supplied from the depth pulse generating means 27.

The 1 output from flip-flop 123 is supplied to the energizing input of a ring counter or stepping switch 133. Everytime the flip-flop 123 is transferred from the 0 to 1 state, the ring counter or stepping switch 133 will step to the next position. The 1 output from flip-flop 123 also supplies the power for the ring counter or stepping switch 133 to supply to the circuitry of FIGURE 16. The output of ring counter or stepping switch 133 constitutes the B' output of instruction sequencer 86. Thus, each time ring counter 133 is energized, a different conductor of the B' output will be energized. This 1 output from flip-flop 123 is also supplied to one input of an OR gate 135 to which also is supplied the 1 output of flip-flop 129, the 1 output of flip-flop 132, and the 1 output of flip-flop 131. The output of OR gate 135 constitutes the G' output of instruction sequencer 86.

The 1 output from flip-flop 126 is supplied to the energizing input of ring counter or stepping switch 134 whose output constitutes the D' output of instruction sequencer 86. The 1 output of flip-flop 127 is connected to the energizing input of ring counter or stepping switch 136, whose output constitutes the C' output of instruction sequencer 86. The 1 output from flip-flop 127 is connected to one input of an AND gate 137, the other input being supplied from clock 120. The 1 output from flip-flop 129 is also connected to the energizing input of a ring counter or stepping switch 138, the output thereof constituting the E' output of instruction sequencer 86. The 1 output of flip-flop 131 constitutes the K output of instruction sequencer 86, and the 1 output of flip-flop 132 constitutes the I output thereof. This 1 output from flip-flop 132 is also connected to the energizing input of a ring counter 139 whose output constitutes the H output of instruction sequencer 86. The ring counters 134, 136, 138 and 139 all operate in the same manner as ring counter 133 described above. The various diodes shown in FIGURE 17 serve the purpose of isolating the various circuits from one another and need not be discussed further.

The derived well logging signal $S_{n+1}$ from the downhole investigating apparatus is digitized at time $t_1$ by the A' output from instruction sequencer 86 and placed in shift register 86a where it is temporarily stored. Now, assume for the moment that signals $S_n$ and $S_{n+1}$ are stored in buffer memory 88. At this same time $t_1$, the energization of flip-flop 123 causes ring counter 133 to provide a signal over the proper conductor of the B' output so as to open the proper gate of gates 89 which in effect connects the proper memory station of buffer memory 88 to the shift register 91 where the data word in memory is shifted in. This data word in memory corresponds to the computing station $S_n{}^c$ in FIGURE 14(a). Thus, a prior well logging signal $S_n$ which has been stored by buffer memory 88 is shifted into shift register 91. Note that the signal $S_{n+1}$ at station $S^c{}_{n+1}$ is actually being derived at this time even though the recording point is at computing station $S^c{}_n$, and thus the signal $S_n$ at station $S^c{}_n$ is the stored signal in this case.

This data word in shift register 91 at this time corresponds to the well logging signal $S_n$ before weighting (i.e. $S_n$ and not $$\frac{F}{A} S_n \Big)$$

Next, at time $t_2$, the proper conductor from ring counter 134 energizes the proper gate of gates 97 so as to connect the proper logic circuit of logic circuits 98 to binary counter 95. A bit is generated from the proper logic circuit of logic circuits 98 at given intervals, which intervals correspond to the bit capacity of shift register 91. Thus, one bit is generated from the proper logic circuit of logic circuits 98 to AND gate 99 each time the contents of shift register 91 are emptied. The particular bit, one or zero, generated from logic circuits 98 remains continuously applied to AND gate 99 so long as it takes the contents of shift register 91 to be shifted out thereof. AND gate 99 in combination with full adder 105, delay 106 and accumulator 106 perform the multiplication and addition operation. Now remembering that the computing station $S^c{}_n$ of FIGURE 14(a) is a positive weight, the sign bit from the particular logic circuit of logic circiuts 98 corresponding to the $S^c{}_n$ station will generate a 0 (0 is considered positive, 1 is negative) at this time. This sign bit generation from logic circuits 98 can be handled, for example, by the presence or absence of a diode connected to the first stage of binary counter 95. Thus, the first pulse from scalar 98a will generate the sign bit of the weighting function, i.e., a "0" or "1." Now assuming that $S_n$ is positive, a "0" will be located in the sign bit position of shift register 91. Thus, since both inputs to exclusive OR gate 102 are "0," the output will be "0," thus leaving gates 100 and 101 unenergized.

Shift register 91 shifts the contents thereof to AND gate 99 which compares all of the bits of the data word contained therein (at this time, the data word $S_n$) with the first bit generated from logic circuits 98a. These bits shifted from shift register 91 are recirculated through delay 92 back to the input of shift register 91, since the contents of shift register 91 must be compared with each of the bits generated from logic circuits 98. The delay 92, a one bit delay, provides the necessary positioning of the bits with respect to one another for the multiplication operation as will be shown later. The carries from adder 105 which may occur are handled through delay 106. Thus, the contents of accumulator register 106a (at this time, zero), the output of AND gate 99, and the carry bit are all applied to full adder 105 in the normal manner. After all of the weighting bits from logic circuits 98 are generated and compared with the contents of shift register 91, accumulator register 106a will contain the desired result of the weighting function from logic circuits 98 times the particular well logging signal which was withdrawn from buffer memory 88, in this case $S_n$ (i.e., $$\frac{F}{A} S_n)$$

From FIGURE 16, it can be seen that at the same time that this multiplying process was occurring, the output C' from instruction sequencer 86 was energized, causing the contents of shift register 86a to be supplied to the proper memory station of buffer memory 88 by virtue of gates 87. This particular information in register 86a corresponds to the currently derived well logging signal $S_{n+1}$. Flip-flop 127 is reset at time $t_3$ which closes the gate which was open within gates 87. This time $t_2$–$t_3$ is exactly equal to the amount of time required to shift the contents of register 86a into buffer memory 88. At time $t_4$, ring counter 133 is actuated to again step to the next position, thus connecting the proper memory station within buffer memory 88 to shift register 91 to be read thereinto. At the same time, inhibit gate 93 is energized to keep the data bits corresponding to $S_n$ from being recirculated. At time $t_5$, flip-flop 126 causes ring counter 134 to provide an output to the proper logic circuit of logic circuits 98. This time $t_4$–$t_5$ is equal to the time required to shift the data word within buffer memory 88 into shift register 91. Also, at time $t_5$, binary counter 95 is reset to the zero position through OR gate 94.

The data word in shift register 91 at this time corresponds to the well logging signal $S_{n+1}$ at the computing station $S^c_{n+1}$ of FIGURE 14(a). Remembering that the computing station $S^c_{n+1}$ has a negative weight, the particular logic circuit which is connected to binary counter 95 at this time will generate a one output to exclusive OR gate 102 which causes flip-flop 97 to energize gates 100 and 101 and cause the data bits from AND gate 99 to be supplied through inverter 103 (assuming $S_{n+1}$ is positive). This provides the one's complement of the output of AND gate 99 which causes a negative multiplication of the data word in shift register 91. There may be an end around carry existing from the highest order bit position after this one's complement addition. This end around carry is taken care of by delay 106 which causes the end around carry of the most significant bit position from shift register 91 to arrive concurrently with the least significant bit position of registers 91 and 106. After the contents of register 91 have been emptied for the last time for any given data word, at this time $S_{n+1}$, the end around carry from that data word, after a one bit delay by delay 106, will arrive concurrently with the least significant bit positions of registers 91 (now containing a new data word) and 106 by virtue of the timing of instruction sequencer 86.

The data word present at this time in accumulator register 106 represents the results of the weighted combination $S_n$ and $S_{n+1}$, and thus, the operation up to now represents preparing the original V.G.F. $G_8$ for the computational process depicted in FIGURE 13(a). That is to say, the data word in accumulator register 106 at this instant of time, represents a number proportional to a well logging signal derived as if the coil array had the V.G.F. $G_{10}$ as shown in FIGURE 14(b).

Assume for now that the computed values $C_{n-1}$, $C_{n-2}$, $C_{n-3}$ and $C_{n-4}$ are stored in buffer memory 110 in suitable memory stations therein. Now, at time $t_6$, flip-flop 129 energizes ring counter 138, which causes the proper memory station of buffer memory 110 to be serially shifted into shift register 91 in the same manner that the data words were shifted from buffer memory 88. Upon the contents of the particular memory station of buffer memory 110 being shifted into shift register 91, flip-flop 126 is again energized causing ring counter D' to energize the proper gate of gates 97, again causing the proper logic circuit of logic circuits 98 to be connected to binary counter 95, and at the same time resetting binary counter 95 and flip-flop 97. The multiplication process as above described is then carried out. This process is repeated over and over again for as many computing stations as is desired. This is depicted in FIGURE 10 at the times $t_8$ and $t_9$ corresponding to $C_{n-2}$, $t_{10}$ and $t_{11}$ corresponding to $C_{n-3}$, and $t_{12}$ and $t_{13}$ corresponding to $C_{n-4}$. It can be seen then that the multiplication by weighting functions of the data words, and addition of the weighted data words of Equation 29 occur simultaneously by virtue of the fact that accumulator register 106a always contains the result of the previous operations of the various terms of Equation 29.

To provide for a final end around carry, if necessary, flip-flop 131, energized at time $t_{14}$, resets flip-flop 97 and energizes inhibit gate 92a, so that the contents of accumulator register 106a can be shifted through full adder 105 without interference from shift register 91 in the event that an end around carry has occurred. At time $t_{15}$, flip-flop 132 energizes ring counter 139 which causes a proper gate of gates 109 to become energized (H output), and also energizes gate 108 (I output). Thus, the contents of accumulator register 106, which is the final computer value $C_n$, is shifted serially into the proper memory station of buffer memory 110 through the proper gate of gate 109. At the same time, inhibit gate 107 is energized by the I output of instruction sequencer 86 prohibiting the contents of accumulator register 106 from being shifted through full adder 105. The contents of accumulator register 106 are also shifted into digital tape recorder 112 whose recording medium remains stationary until pulsed by the J output of instruction sequencer 86. Also, the data word $C_n$ from accumulator register 106a is converted to analog signals proportional to $C_n$ by digital-to-analog converter 113, whose output is recorded by recorder 114. Next, at time $t_{16}$, the J output from instruction sequencer 86 causes digital tape recorder 112 to step to the next position in readiness for another data word. This same $t_{16}$ output causes flip-flop 140 to enable AND gate 133 for the next depth pulse from depth pulse generating means 27 which resets binary counter 121 and flip-flop 140 in readiness for another sequence identical to the above described sequence. The time duration $t_1$ to $t_{16}$ is set such that it will always be less than the time duration between depth pulses from depth pulse generating means 27.

It can be seen that buffer memory 88 will always contain the two derived signals $S_n$ and $S_{n+1}$ in digital form and buffer memory 110 will contain the computed signals $C_{n-1}$, $C_{n-2}$, $C_{n-3}$ and $C_{n-4}$ in digital form. In both cases, since these data words are read into the buffer memories in a given sequence, the ring counters of sequencer 86 can be set to always energize the proper gate of the various gate circuits, to always read out the proper data words in sequence.

Now, taking an example of how the digital computer of FIGURES 16 and 17 operates, Table I illustrates a simple example of the mathematical operation $$5 \cdot 4 - 6 \cdot 4 + 2 \cdot 3$$

which results in the answer of 2. This simple example is merely illustrative, and it is to be understood that in actuality, much more complex numbers would be processed in the digital computer circuitry.

TABLE I

| Sign | $2^5$ | $2^4$ | $2^3$ | $2^2$ | $2^1$ | $2^0$ | |
|---|---|---|---|---|---|---|---|
| 0 | 0 | 0 | 0 | 0 | 0 | 0 | Initial contents of accumulator register 106a. |
| 0 | 0 | 0 | 0 | 0 | 0 | 0 | Number "4" times least significant bit of "5". |
| 0 | 0 | 0 | 0 | 1 | 0 | 0 | Result in accumulator register 106a. |
| 0 | 0 | 0 | 0 | 0 | 0 | 0 | Number "4" times next higher order bit of "5". |
| 0 | 0 | 0 | 0 | 1 | 0 | 0 | Result in accumulator register 106a. |
| 0 | 0 | 1 | 0 | 0 | 0 | 0 | Minus the number "4" times next higher order bit of "5". |
| 0 | 0 | 1 | 0 | 1 | 0 | 0 | Result in accumulator register 106a. |
| 1 | 1 | 1 | 1 | 1 | 1 | 1 | Minus the number "6" times lowest order bit of "4". |
| 0 | 0 | 1 | 0 | 0 | 1 | 1 | Result in accumulator register 106a. |
| | | | | | | 1 | End around carry. |
| 1 | 1 | 1 | 1 | 1 | 1 | 1 | Minus the number "6" times next higher order bit of "4". |
| 0 | 0 | 1 | 0 | 0 | 1 | 1 | Result in accumulator register 106a. |
| | | | | | | 1 | End around carry. |
| 1 | 1 | 0 | 0 | 1 | 1 | 1 | Number "6" times next higher order bit of "4". |
| 1 | 1 | 1 | 1 | 0 | 1 | 1 | Result in accumulator register 106a. |
| | | | | | | 0 | End around carry. |
| 0 | 0 | 0 | 0 | 0 | 0 | 0 | Number "3" times lowest order bit of "2". |
| 1 | 1 | 1 | 1 | 0 | 1 | 1 | Result in accumulator register 106a. |
| 0 | 0 | 0 | 0 | 1 | 1 | 0 | Number "3" times next higher order bit of "2". |
| 0 | 0 | 0 | 0 | 0 | 0 | 1 | Result in accumulator register 106a. |
| | | | | | | 1 | Final end around carry. |
| 0 | 0 | 0 | 0 | 0 | 1 | 0 | Result. |

It can be seen that the result in the final column of Table I is 2 as expected. It can also be seen that the sign bit position goes negative during the $-6\cdot 4$ operation, as expected, but the polarity takes care of itself. Obviously, there would be many more operations than as shown in Table I to carry out the operation of the instruction sequencer of FIGURE 17, but only three simple operations where shown for brevity.

The equations hereintofore discussed for the computed signal $C_n$ have imposed the restriction that the sum of all of the weighting functions must be equal to one for normalization. However, it may be undesirable to use fractions in the computational process. In this case, all of the weighting functions utilized in determining the computed value $C_n$ may be multiplied by a constant such that no fractions need exist in the computer. To make matters easy, this constant should be picked such that it is a number equal to $2^z$ where $z$ is a positive integer. By so doing, the data word read out of accumulator register 106a at the end of the computation process will need no further computation, by division, to arrive at the correct information. Instead, a decimal point need only be assigned in the proper place in the digital tape recorder 112 and a similar factor provided in digital-to-analog converter 113. Thus, if the number in which the weighting stations are to be multiplied by, is $2^5$ (32), then the decimal point will be positioned 5 bit positions to the left of the lowest order bit position. Thus, for example, if the binary number 0110011001 is shifted out of accumulator register 106a, the number appearing in digital tape reorder 112 will be 01100.11001.

It is to be understood that the various computational processes shown in the other embodiments as being performed using analog techniques could also be carried out in digital form in the apparatus of FIGURES 16 and 17. Thus, for example, if digital processing were used to perform the function of the FIGURE 12 apparatus, the output of shift register 86a need only be connected to (a single) gate 89 to be combined with the computed data words $C_{n-1}$, $C_{n-2}$, etc., as depicted by dotted line 89a. Additionally, other types of digital computers besides the serial binary one shown in FIGURES 16 and 17 could be utilized, such as a parallel type. Other codes could also be utilized in accordance with the teachings of the present invention, such as for example, the excess 3 code, 2 out of 5 code, etc.

Also, it is to be understood that geometrical factors having other shapes than the examples given in this application could be utilized in accordance with the present invention, and the procedures for determining the positions of the computing stations, sample and memory stations and the polarity and weights of the individual computing stations shown in this application could as well be applied to any other geometrical factor. Also, it is to be understood that other types of weighted adding networks could be utilized than the particular ones shown, as for example, weighting circuits using operational amplifiers. Additionally, while only an induction logging system has been specifically illustrated, other types of logging systems such as, for example, sonic logging systems and radioactivity logging systems could be utilized in accordance with the present invention. Even though the teachings of the present invention in connection with the particular geometrical factors shown are applicable to other geometrical factors, the particular geometrical factors shown in this application provide especially desirable results because of the automatic cancellation of any errors which may occur, as described earlier.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. Apparatus for processing well logging signals comprising:
   (a) means for deriving signals representative of a characteristic of earth formations surrounding a borehole at different depth levels in the borehole, each of the derived signals being representative of the characteristic in a given portion of a formation;
   (b) means for combining each derived signal with at least one other signal to provide computed signals representative of the investigating characteristic at depth levels correlated with the depth levels of said derived signals, the vertical formation response of said computed signals being sharper than the response of said derived signals;
   (c) memory means for storing the computed signals including means for writing the computed signals into the memory means; and
   (d) means for reading out individual stored computed signals from the memory means at later times for application to the combining means as said at least one other signal to produce the computed signals, read-out computed signals being representative of the earth formation characteristic at previously investigated depth levels so as to cancel out a selected formation response portion of each derived signal.

2. The apparatus of claim 1 wherein said at least one other signal comprises a plurality of read-out computed signals $C_{n-1}, \ldots, C_{n-m}$, representative of the computed earth formation characteristic at selected depth points in the borehole, the combining means combining the plurality of computed signals with each derived signal $S_n$ to obtain said computed signal $C_n$ in accordance with the relationship:

$$C_n = xS_n + yC_{n-1} + \ldots + zC_{n-m}$$

where $x, y, \ldots, z$ are weighting factors of positive or negative polarity.

3. The apparatus of claim 1 wherein:
(1) the means for deriving signals includes means for sampling the derived signals at selected depth points;
(2) the memory means for storing the computed signals has memory stations which correspond to the same depths as said selected depth points throughout the borehole; and
(3) the means for reading out the computed signals includes means for reading out the computed signals of selected ones of said memory stations for combination with each sampled signal, said selected ones of the memory stations and the particular sampled depth point comprising computing stations.

4. The apparatus of claim 3 wherein the depth interval between the memory stations is equal to $$\frac{LCD}{N}$$

where LCD is the lowest common denominator of the intervals between successive computing stations and N is a positive integer.

5. The apparatus of claim 1 wherein the derived signals represent the characteristic of the surrounding earth formations as investigated by investigating apparatus having a vertical geometrical factor of a given shape, the computed signals representing the earth formation characteristic as if investigated with investigating apparatus having a vertical geometrical factor having improved vertical response.

6. The apparatus of claim 1 and further including recorder means adapted for recording the computed signals for providing a computed log of the characteristic of the surrounding earth formations.

7. The apparatus of claim 5 wherein the means for deriving signals includes:
(1) means adapted for movement through the borehole for investigating the surrounding earth formations and generating signals representative of the characteristic, the investigating apparatus having a vertical geometrical factor of a given shape; and
(2) means for sampling said signals at selected depth points throughout the borehole and providing a sampled signal representative of the characteristic at each sampled depth point to be combined with said at least one other signal.

8. The apparatus of claim 7 wherein said means for investigating the surrounding earth formations comprises:
(1) a coil array adapted for movement through the borehole;
(2) means for energizing a portion of the coil array for inducing current into the surrounding earth formations; and
(3) means, including a portion of the coil array, responsive to the current induced in the surrounding earth formations for providing the signals representative of the characteristic of the surrounding earth formations, the characteristic being conductivity.

9. The apparatus of claim 7 wherein the means responsive to the generated signals for sampling said signals further includes means responsive to the movement of the investigating apparatus through the borehole for enabling the sampling means to sample the generated signal at specified depth points throughout the borehole.

10. The apparatus of claim 5 wherein the means for deriving a signal includes:
(1) recorder means for generating signals representative of the characteristic of the surrounding earth formations, last-named signals having been previously recorded;
(2) means for sampling said signals at times corresponding to selected depth points throughout the borehole and providing a sampled signal representative of the characteristic at each sampled depth point to be combined with said at least one other signal.

11. The apparatus of claim 1 wherein:
(1) the memory means comprises a plurality of memory stations selectively operable to store the computed signals from the selected depth points in selected depth points in selected memory stations; and
(2) the read-out means includes means adapted to be coupled to selected ones of the memory stations for reading out selected ones of the memorized computed signals for combination with each derived signal.

12. The apparatus of claim 11 wherein the read-out means further includes means for successively reading out the computed signals from successive memory stations; and further including recorder means for recording the successive read-out computed computed signals to provide a computed log of the characteristic as a function of depth.

13. The apparatus of claim 12 wherein said at least one other signal comprises a plurality of read-out computed signals $C_{n-1}, \ldots, C_{n-m}$, representative of the computed earth formation characteristic at selected depth points in the borehole, the combining means combining the plurality of read-out computed signals with each derived signal $S_n$ to obtain each computed signal $C_n$ in accordance with the relationship:

$$C_n = xS_n + yC_{n-1} + \ldots + zC_{n-m}$$

where $x, y, \ldots z$ are weighting factors of positive or negative polarity.

14. The apparatus of claim 1 wherein:
(1) the means for deriving signals includes means for providing sampled digital data words representative of the characteristic at selected depth points;
(2) the means for storing the computed signals includes a digital memory for storing the computed data words;
(3) the means for reading out the computed signals includes means for gating the data words out of the digital memory;
(4) the means for combining includes digital arithmetic means for combining each sampled data words with at least one read-out computed data words to provide each new computed data word; and further including
(5) sequencing means for controlling the sequence of operation of the sampling, storing, read-out, and combining means.

15. The apparatus of claim 14 wherein the means for providing sampled digital data words includes analog to digital converter means for converting analog representations of the characteristic of surrounding earth formations to the digital data words in response to control signals from the sequencing means.

16. The apparatus of claim 15 wherein:
(1) the means for deriving signals includes means for gating each sampled data word into the digital arithmetic unit in response to a control signal from the sequencing means;
(2) the means for reading out includes gating means responsive to a signal from the sequencing means for gating each computed data word into the arithmetic means; and (3) the digital arithmetic means includes:
(a) means responsive to a signal from the sequencing means for generating at least one digital weighting function; and
(b) means for multiplying selected digital weighting functions times each read-out computed data word and each sampled data word to obtain a new computed data word.

17. The apparatus of claim 16 wherein a plurality of read-out computed data words are combined with each sampled data word and the gating means is responsive to a plurality of control signals from the sequencing means for selectively gating different ones of the computed data words into the digital arithmetic means.

18. Apparatus for processing well logging signals comprising:
(a) means for deriving signals representative of a characteristic of earth formations surrounding a borehole, including means for sampling the derived signal at given depth levels, each of the derived signals being representative of the characteristic in a given portion of a formation;
(b) means for storing the sampled signals;
(c) means for combining a plurality of the sampled signals to provide computed sampled signals representative of the investigated characteristic at different depth points, at least one of the stored sampled signals comprising at least one of the sampled signals to be combined;
(d) means for combining each of the computed sampled signals with at least one other signal to provide computed signals representative of the investigated characteristic at depth levels correlated with the depth levels of said derived signals, the vertical formation response of said computed signals being sharper than the response of said derived signals;
(e) memory means for storing the computed signals; and
(f) means for reading out individual stored computed signals from the memory means at later times for application to the combining means as said at least one other signal to produce the computed signals, the read-out computed signals being representative of the earth formation characteristic at previously investigated depth levels so as to cancel out a selected formation response portion of each derived signal.

19. The apparatus of claim 18 wherein:
(1) the means for providing sampled signals comprises means for providing sampled digital data words representative of the characteristic;
(2) the means for storing the sampled signals and the computed signals includes a digital memory for storing the sampled and computed data words;
(3) the means for reading out the computed signals and said at least one of the stored sampled signals includes means for gating the computed and stored sampled data words out of the digital memory;
(4) the means for combining includes digital arithmetic means for combining each sampled data word with said at least one stored computed data word to provide the new computed data word; and further including
(5) sequencing means for controlling the sequence of operation of the sampling, storing, read-out, and combining means.

20. A method of processing well logging signals, comprising:
(a) deriving signals representative of a characteristic of the earth formations surrounding a borehole at different depth levels in the borehole, each of the derived signals being representative of the characteristic in a given portion of a formation;
(b) combining each derived signal with at least one other signal to provide computed signals representative of the investigated characteristic at depth levels correlated with the depth levels of said derived signals, the vertical formation response of said computed signals being sharper than that for said derived signals;
(c) storing the computed signal in a memory means; and
(d) reading out individual stored computed signals from said memory means at later times corresponding to previously investigated depth levels as said at least one other signal for application to the combining means as said at least one other signal to produce the computed signals, the read-out computed signals being representative of the earth formation characteristic at previously investigated depth levels so as to cancel out a selected formation response portion of each derived signal.

21. The method of claim 20 wherein the step of deriving signals includes the steps of:
(1) generating signals indicative of the characteristic of the surrounding earth formations; and
(2) sampling the generated signals at depth points spaced approximately an equal distance apart.

22. The method of claim 21 wherein said at least one other signal comprises a plurality of computed signals, the step of reading out the computed signal comprising reading out a plurality of computed signals $C_{n-1}, \ldots, C_{n-m}$, from selected memory stations, said selected memory stations from which the computed signals are read out and the sampled depth point comprising computing stations; and the step of combining includes combining the signals from the computing stations to obtain each computed signal $C_n$ in accordance with the relationship:

$$C_n = xS_n + yC_{n-1} + \ldots + zC_{n-m}$$

where $S_n$ represents the sampled signal and $x$, $y$, and $z$ represent weighting functions of positive or negative polarity.

23. A method of processing well logging signals, comprising:
(a) deriving signals representative of a characteristic of the earth formations surrounding a borehole including the step of sampling the derived signals at given borehole depth levels, each of the derived signals being represenative of the characteristic in a given portion of a formation;
(b) storing the sampled signals;
(c) combining a plurality of the sampled signals to provide computed sampled signals which are correlated in depth with said derived signals, at least one of the stored sampled signals comprising at least one of the sampled signals to be combined;
(d) combining each computed sampled signal with at least one other signal to provide a computed signal;
(e) storing the computed signal; and
(f) reading out individual stored computed signals at later times corresponding to previously investigated depth levels for application to the combining means as said at least one other signal to produce the computed signals, the read-out computed signals being representative of the earth formation characteristic at previously investigated depth levels so as to cancel out a selected formation response portion of each derived signal.

24. A method of processing well logging signals, comprising:
(a) generating signals representative of a characteristic of the earth formations surrounding a borehole;
(b) sampling the generated signals to obtain a sampled signal representative of the characteristic at a first depth point in the borehole;
(c) reading a signal out of a selected memory station of a memory means;
(d) combing the sampled signal from the first depth point with the read-out signal to provide a first computed point with the read-out signal to provide a first computed signal representative of the investigated characteristic at the first depth point;
(e) storing the computed signal from the first depth point at a selected memory station of a memory means;
(f) sampling the generated signals to obtain a sampled signal representative of the characteristic at a second depth point in the borehole;
(g) reading out the first computed signal from the selected memory station; and
(h) combining the sampled signal from the second depth point with the computed signal from the first depth point to provide a second computed signal representative of the investigated characteristic at the second depth point, the read-out signal to produce the first computed signal representing a computed signal from a previously investigated depth point.

25. A method of processing well logging signals, comprising:
(a) generating signals representative of a characteristic of the earth formations surrounding a borehole;
(b) sampling the generated signals to obtain a sampled signal representative of the characteristic at a first depth point in the borehole;
(c) reading a plurality of stored signals out of selected stations of a memory means;
(d) combining the sampled signal from the first depth point with the plurality of read-out signals to provide a first computed signal representative of the investigated characteristic at the first depth point;
(e) storing the first computed signal from the first depth point at a first selected memory station;
(f) sampling the generated signals to produce a sampled signal representative of the characteristic at a second depth point;
(g) reading out the first computed signal from the first selected memory station and at least one other computed signal from at least one other memory station; and
(h) combining the sampled signal from the second depth point with the first computed signal from the first depth point and said at least one other read-out computed signal to provide a second computed signal representative of the investigated characteristic at the second depth point, said plurality of read-out signals to produce the first computed signal representing other computed signals from previously investigated depth points.

26. Apparatus for processing well logging signals comprising:
(a) means for deriving signals representative of a characteristic of earth formations surrounding a borehole at different depth levels in the borehole, each derived signal being representative of said characteristic over a given vertical increment;
(b) means for combining each derived signal with at least one other signal to provide computed signals representative of the characteristic at depth levels correlated with the depth levels of the derived signals, each computed signal being representative of said characteristic over a vertical increment which is less than the vertical increment for each derived signal;
(c) memory means for storing the computed signals; and
(d) means for reading out individual stored computed signals from the memory means for application to the combining means as said at least one other signal, each combined read-out computed signal operating to cancel out a selected portion of the vertical increment over which each derived signal is representative of the characteristic so as to leave a smaller vertical increment of response for each computed signal.

27. A method of processing well logging signals comprising:
(a) deriving signals representative of a characteristic of earth formations surrounding a borehole at different depth levels in the borehole, each derived signal being representative of said characteristic over a given vertical increment;
(b) combining each derived signal with at least one other signal to provide computed signals representative of the characteristic at depth levels correlated with the depth levels of the derived signals, each computed signal being representative of said characteristic over a vertical increment which is less than the vertical increment for each derived signal;
(c) storing the computed signals in a memory means; and
(d) reading out individual stored computed signals from the memory means and using individual ones of said read-out signals as said at least one other signal, each combined read-out computed signal operating to cancel out a selected portion of the vertical increment over which each derived signal is representative of the characteristic so as to leave a smaller vertical increment of response for each computed signal.

References Cited
UNITED STATES PATENTS

| | | | |
|---|---|---|---|
| 3,076,138 | 1/1963 | Stelzer | 324—1 |
| 3,166,709 | 1/1965 | Doll | 324—6 |
| 3,181,117 | 4/1965 | Sloughter | 324—1 XR |
| 3,230,445 | 1/1966 | Sloughter et al. | 324—6 |
| 3,263,159 | 7/1966 | Albright | 324—1 |
| 3,321,700 | 5/1967 | Zimmerman | 324—8 |
| 3,356,990 | 12/1967 | Sloughter | 324—1 XR |
| 3,391,334 | 7/1968 | Ruehle | 324—8 |

GERARD R. STRECKER, Primary Examiner

U.S. Cl. X.R.

340—172.5